United States Patent [19]

Murphy

[11] 4,340,216
[45] Jul. 20, 1982

[54] BEARING AND SUPPORT

[76] Inventor: Raymond J. Murphy, Rte. 2, Bonne Terre, Mo. 63020

[21] Appl. No.: 135,194

[22] Filed: Mar. 28, 1980

Related U.S. Application Data

[62] Division of Ser. No. 842,532, Oct. 17, 1977, Pat. No. 4,204,719.

[51] Int. Cl.$^3$ ............................................. A63B 69/00
[52] U.S. Cl. .................................. 272/109; 212/134; 254/236; 254/385; 105/150
[58] Field of Search .......................... 272/109, 111, 24; 16/88; 295/1, 44; 308/15, 16, 20, 6 R, 196; 104/135, 134, 1, 94, 95, 89, 62; 193/35 R, 35 MD, 37; 105/150, 154, 155; 254/236, 385; 212/134; 182/37

[56] References Cited

U.S. PATENT DOCUMENTS

| | | | |
|---|---|---|---|
| 1,003,797 | 9/1911 | Beach | 272/109 |
| 1,811,508 | 6/1931 | Klages | 308/6 R |
| 2,190,093 | 2/1940 | Bossart | 182/37 |
| 2,266,660 | 12/1941 | Sloan | 135/194 |
| 3,372,926 | 3/1968 | Murphy | 272/109 |
| 3,432,163 | 3/1969 | Murphy | 272/109 |
| 3,577,930 | 5/1971 | Rooklyn | 16/88 |
| 3,981,500 | 9/1976 | Ryan | 272/109 |

FOREIGN PATENT DOCUMENTS 22863 of 1909 United Kingdom ................. 301/5.7

Primary Examiner—Richard J. Johnson
Attorney, Agent, or Firm—Paul M. Denk

[57] ABSTRACT

In a bearing and support for use either as a bearing, per se, or as a bearinged support for other items and incorporating the bearing of this invention; the bearing includes at least a pair of rotatable members that rotate or counter-rotate about a common axis, a shaft supporting the rotatable members for rotation about its common axis; roller, ball, sleeve, or other forms of bearings disposed between the rotatable members and the shaft to facilitate the rotation of the members therearound; a structural member incorporating a series of keepers upon its upper and lower edges and which retain races or tracks, and being disposed for having one of the rotatable members associated thereon to provide a bearing suspended support for holding other items, or the body of a person. The bearinged support may be of a circular or of a nonannular design, to carry both radial and thrust loads, thereby increasing its various uses, which include, among other concepts, the application of the support for use in conjunction with gymnastic equipment, such as to provide safety during usage of the horizontal bar, balance beam, the trampoline, or even during tumbling, and in addition, the support has usage for facilitating the plight of the invalid. Furthermore, the invention can be used as a bearing to support both radial and thrust loads, can be used in cams, machinery, dollies, manufacturing transfer machines, conveyors, and safety equipment, among other items. A crossarm for movement along a track provides the overhead structure for holding the bearinged support at a variable or fixed disposition therebelow, as during use of the support for one of the aforesaid purposes. The structural member and its races of the support are separable, being held together by means of an adjustable bridging member, thereby advancing the state of the art by allowing the opening up of the bearing races and wrapping the assembly around the shaft, body or load, and by use of the adjustable bridge draw the assembly and load into continuous contact through a tightening and locking the bridge.

36 Claims, 72 Drawing Figures

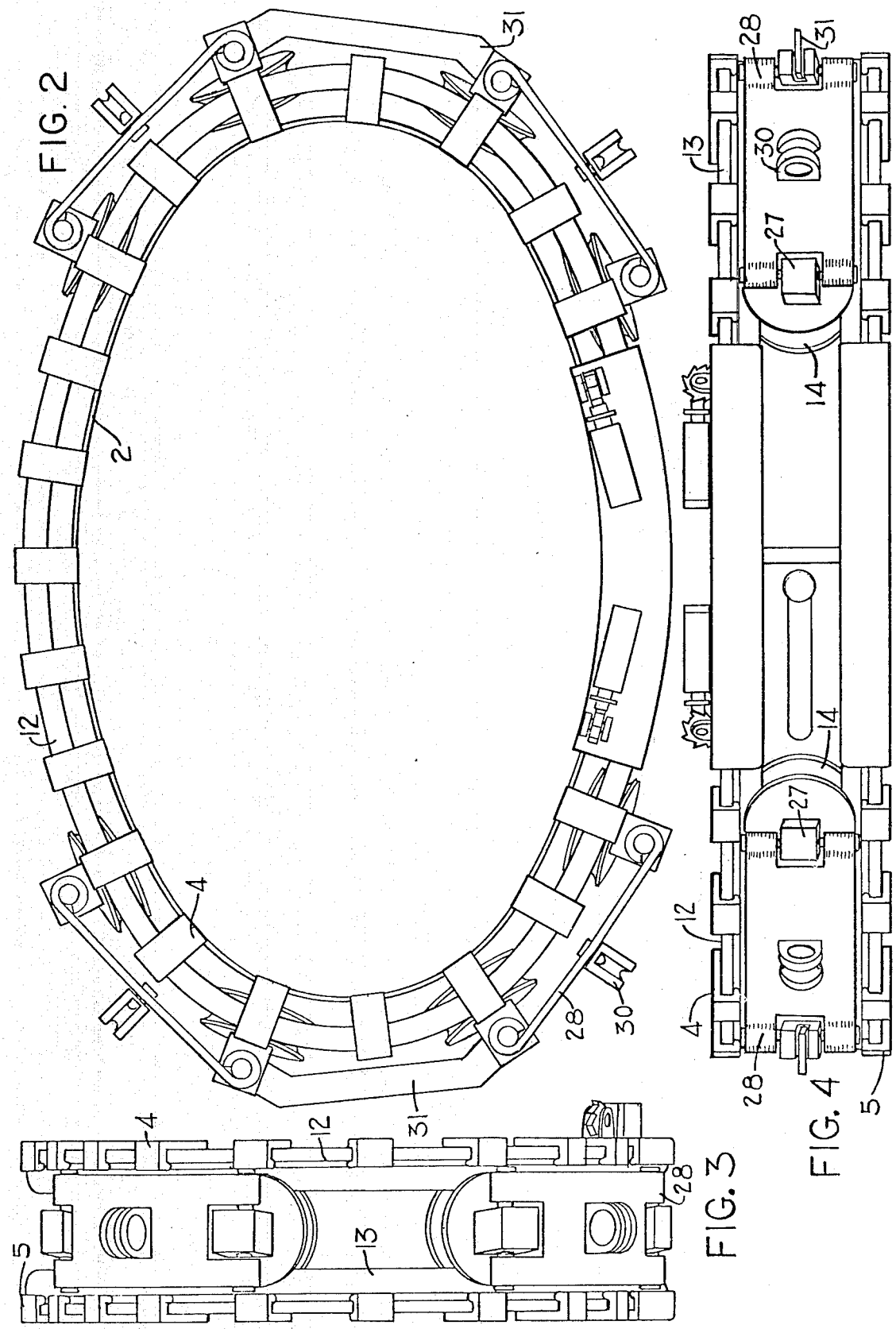

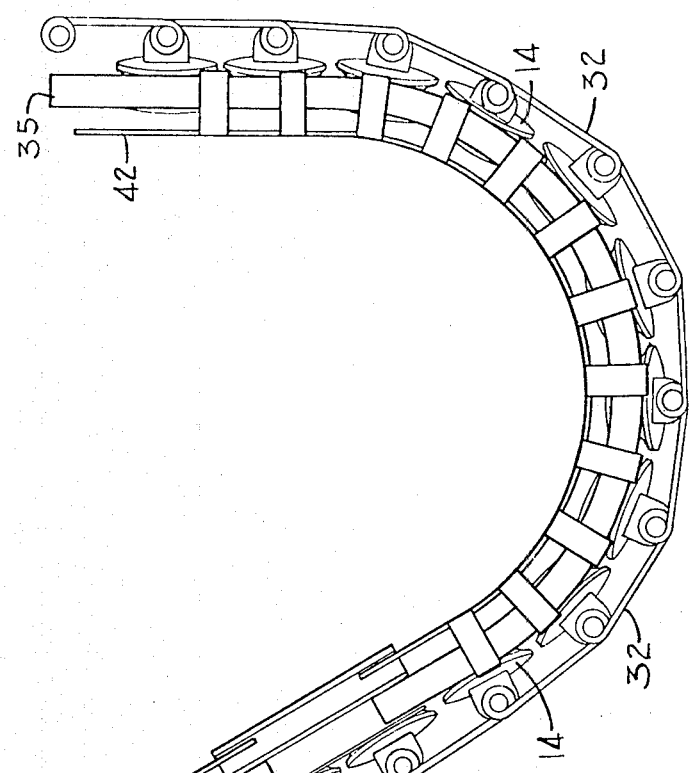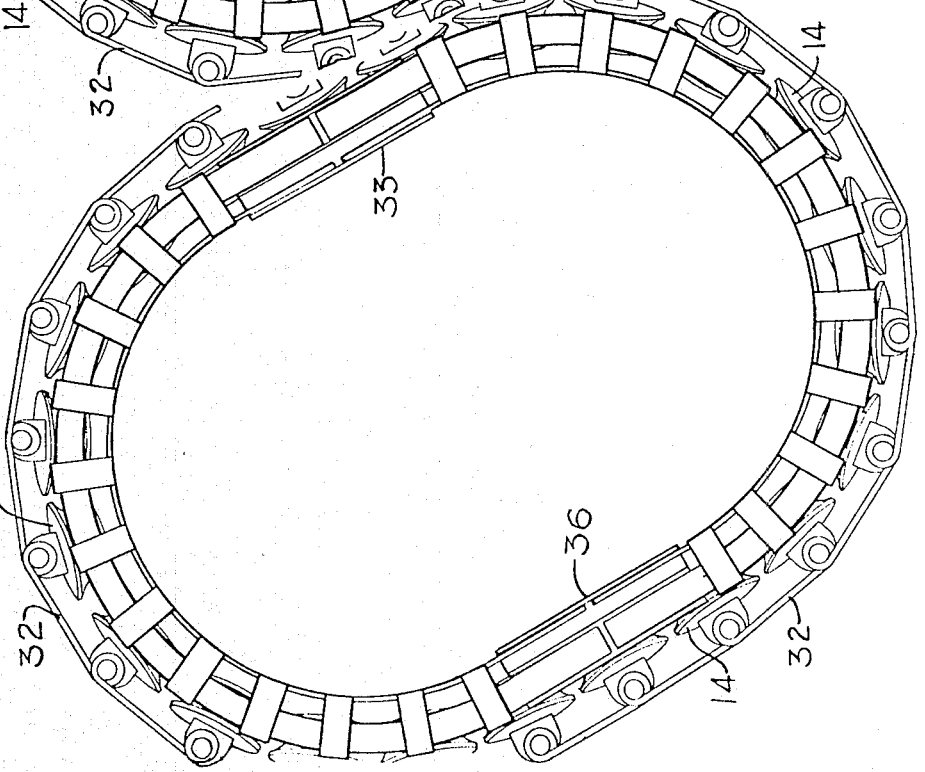

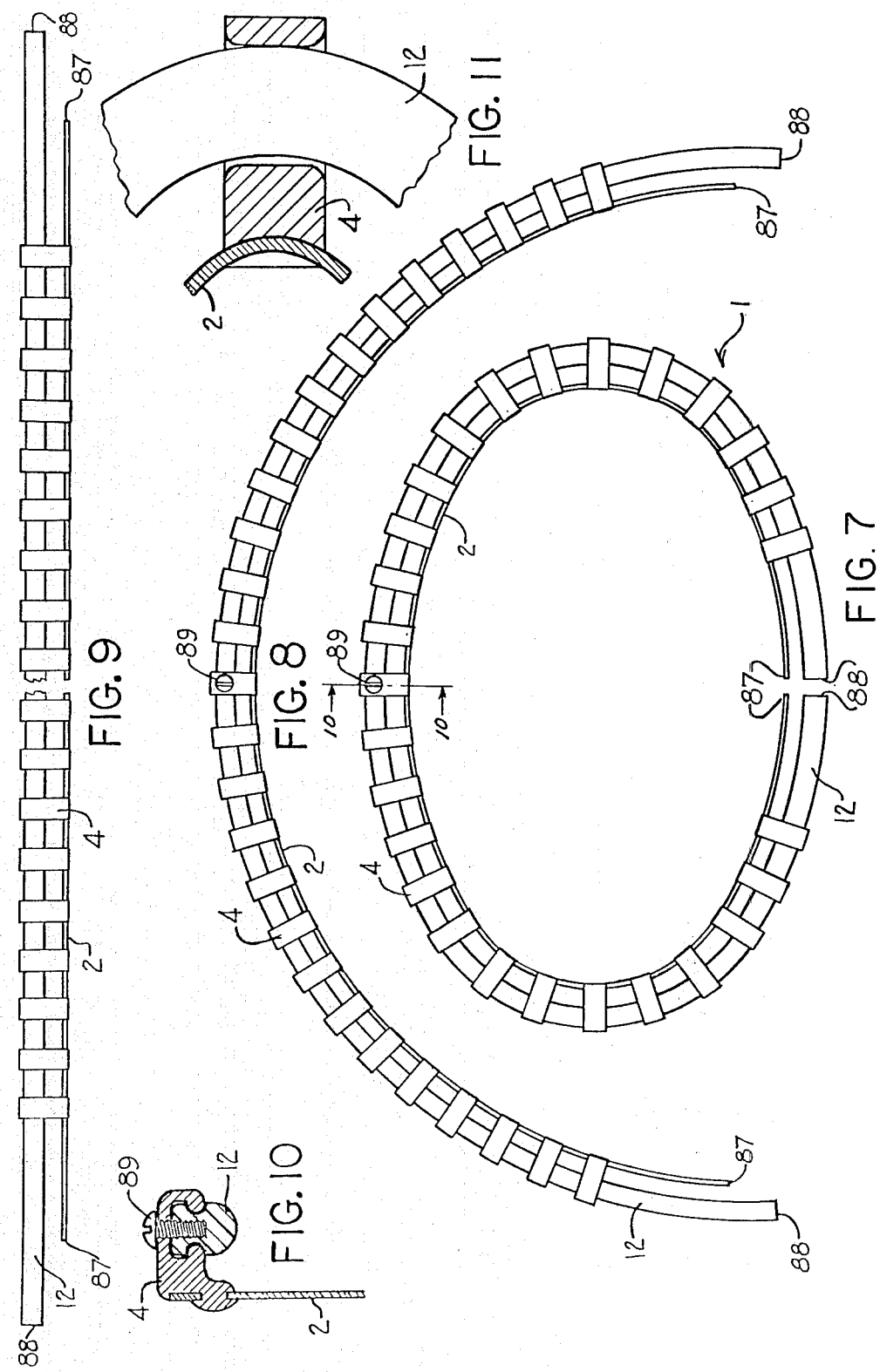

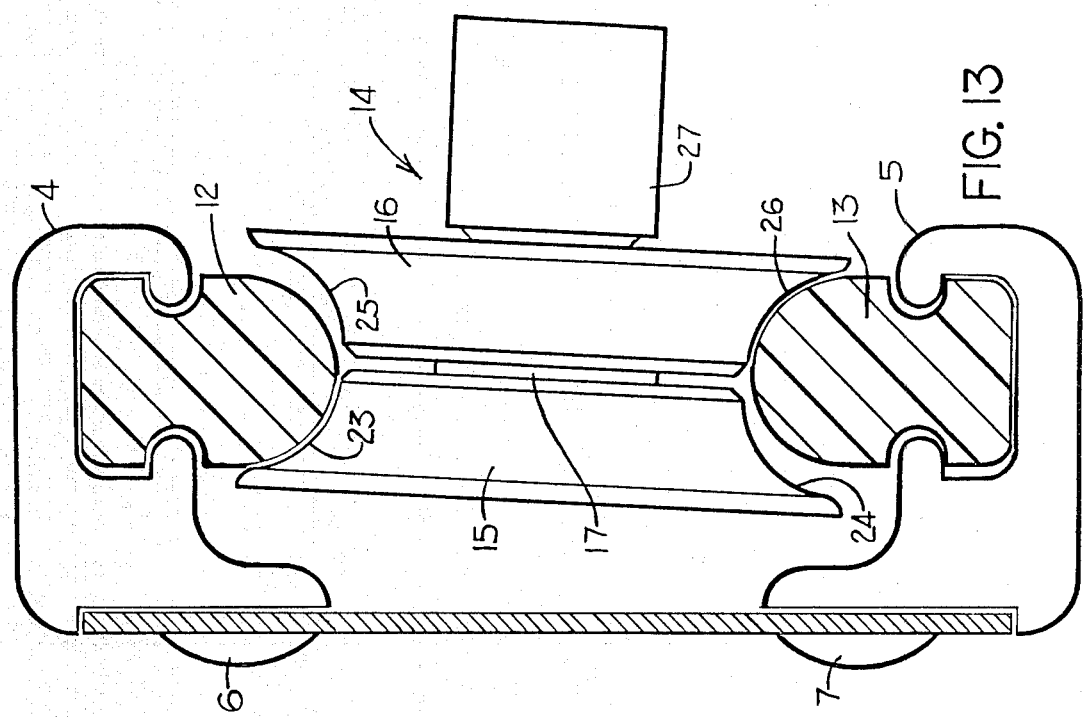
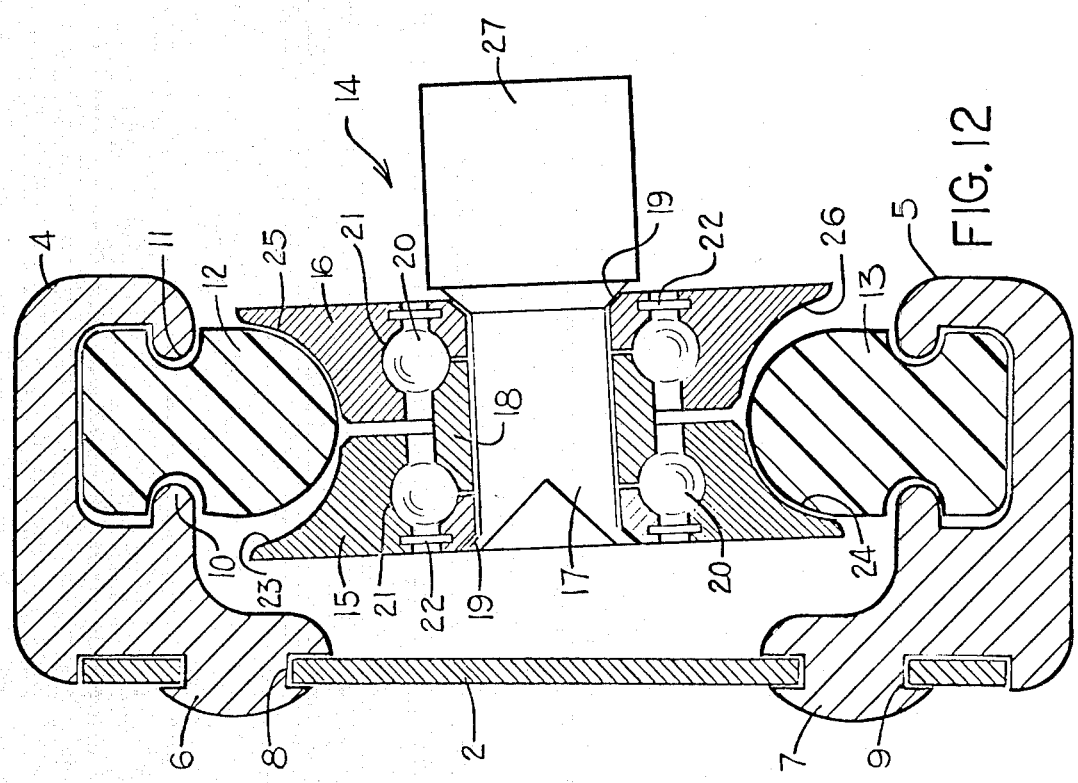

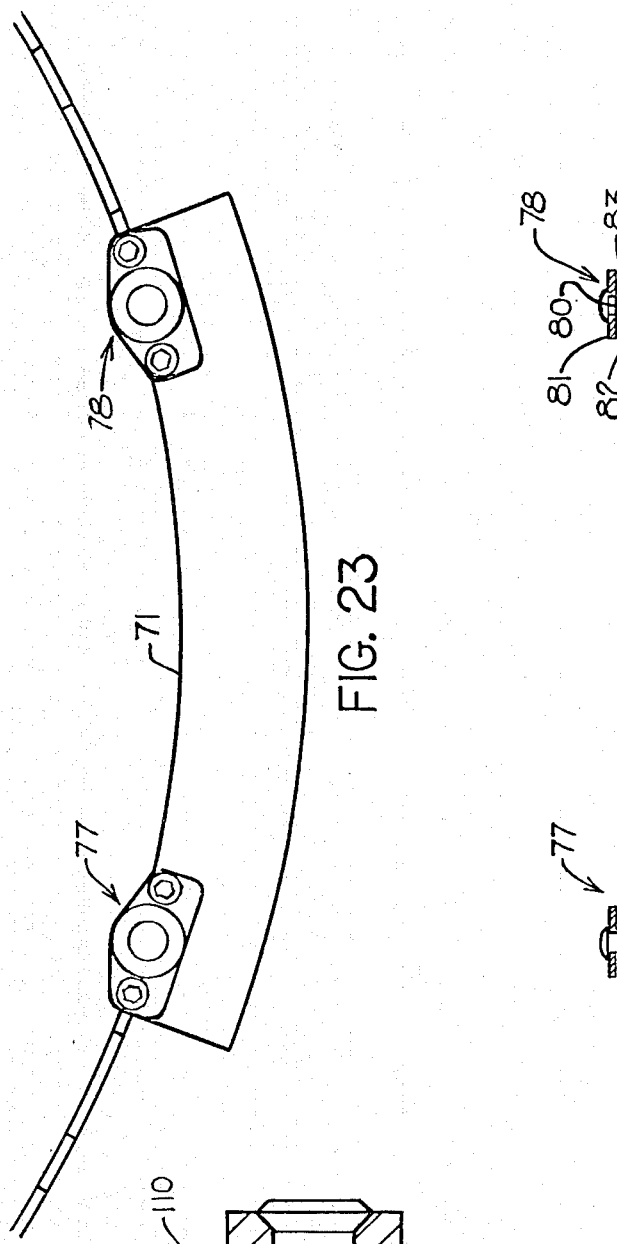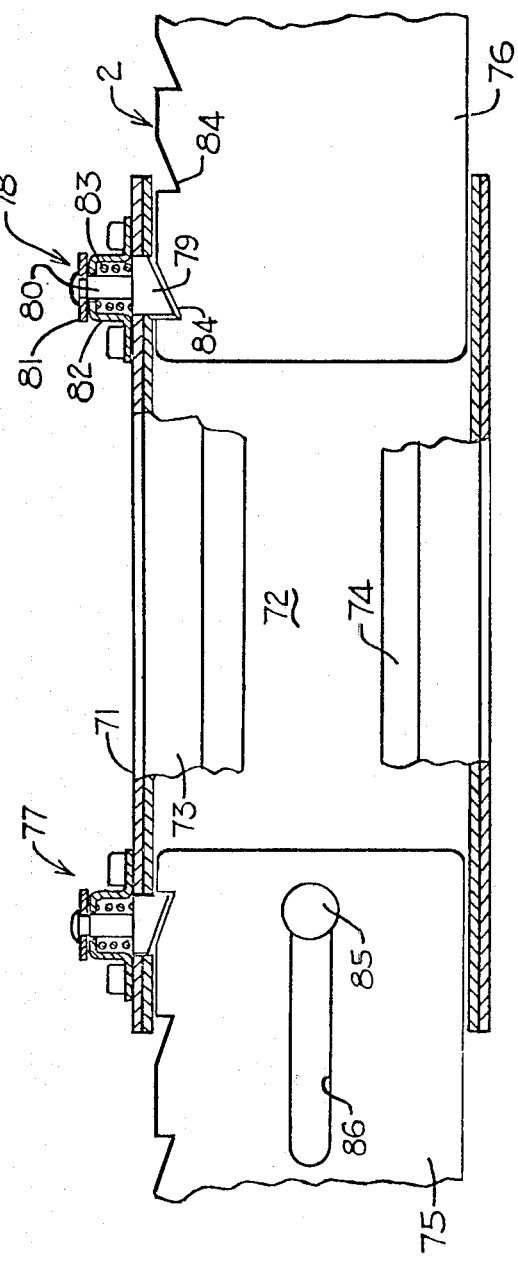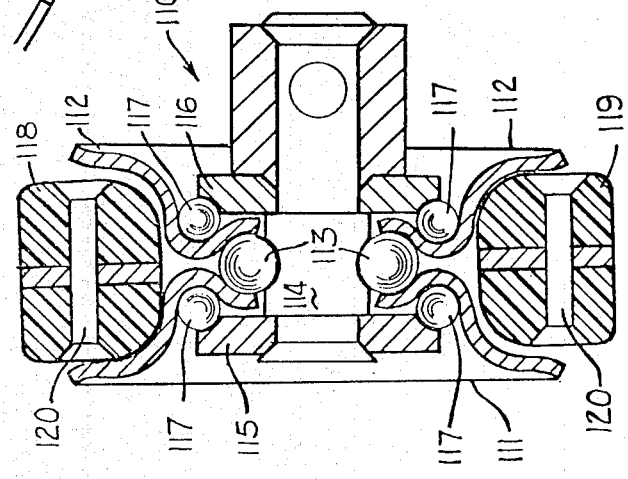

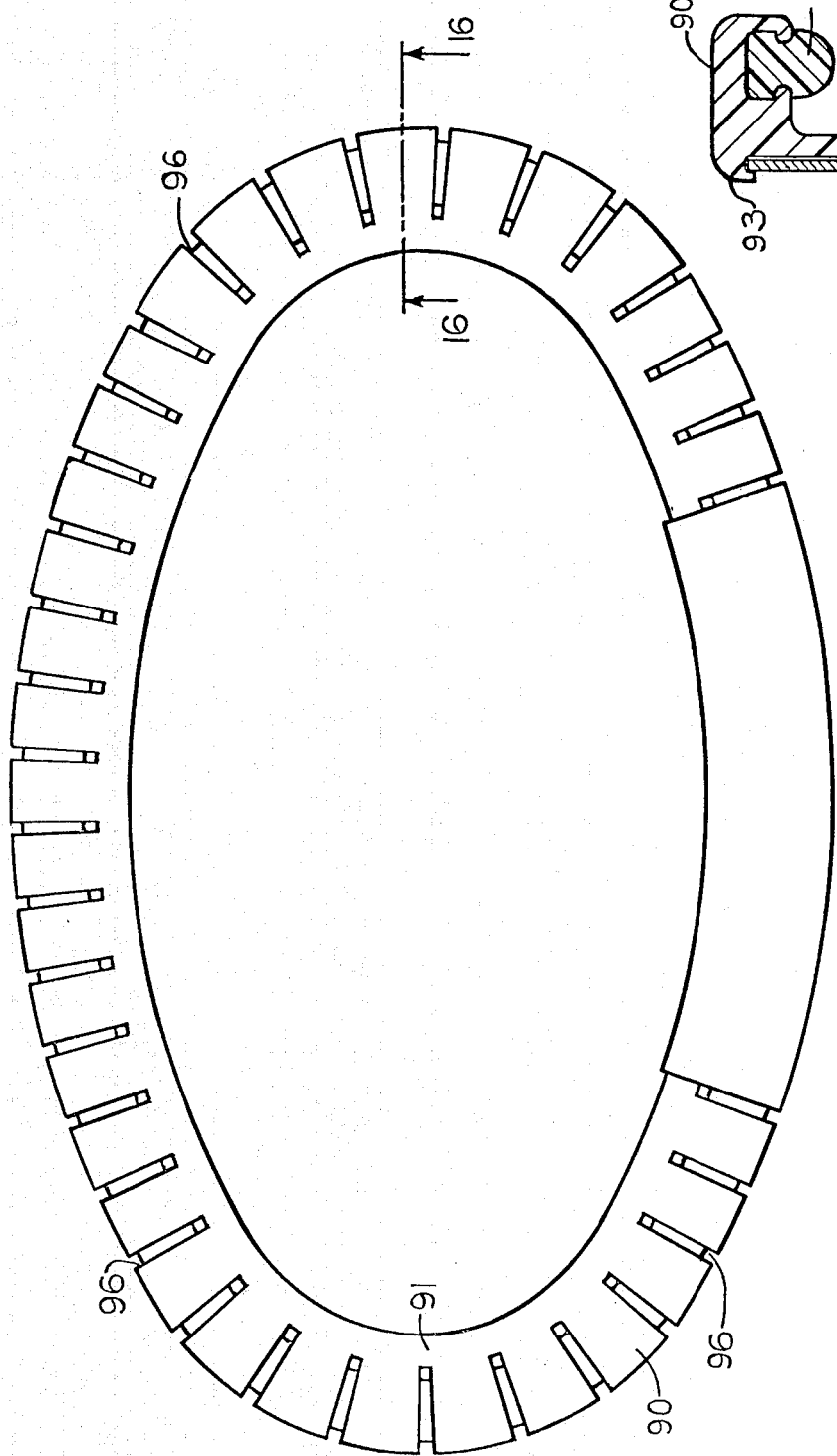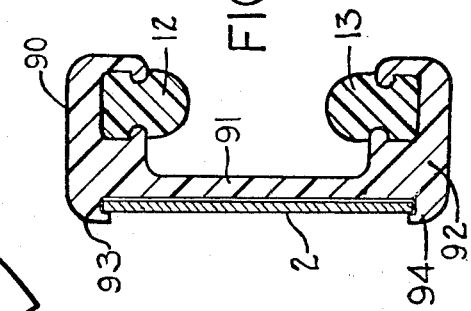
FIG. 15
FIG. 16

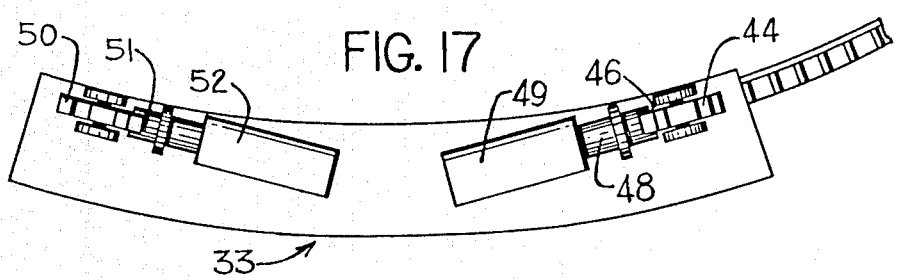
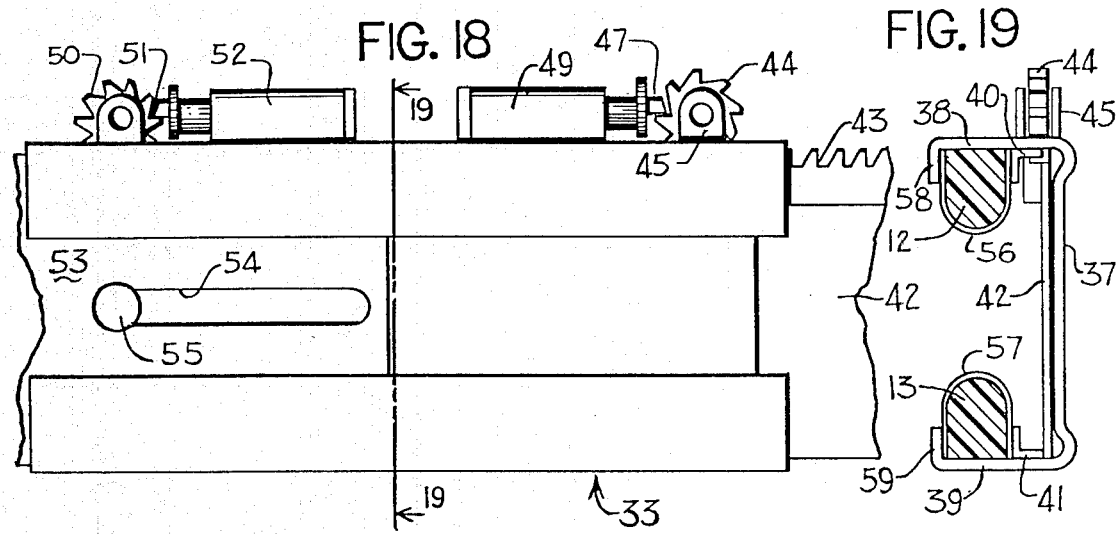
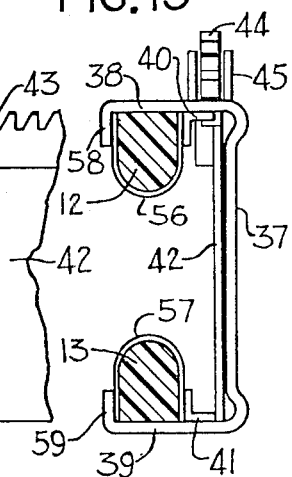
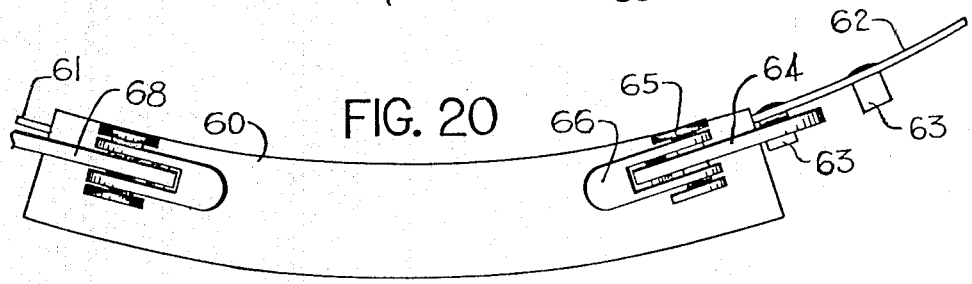
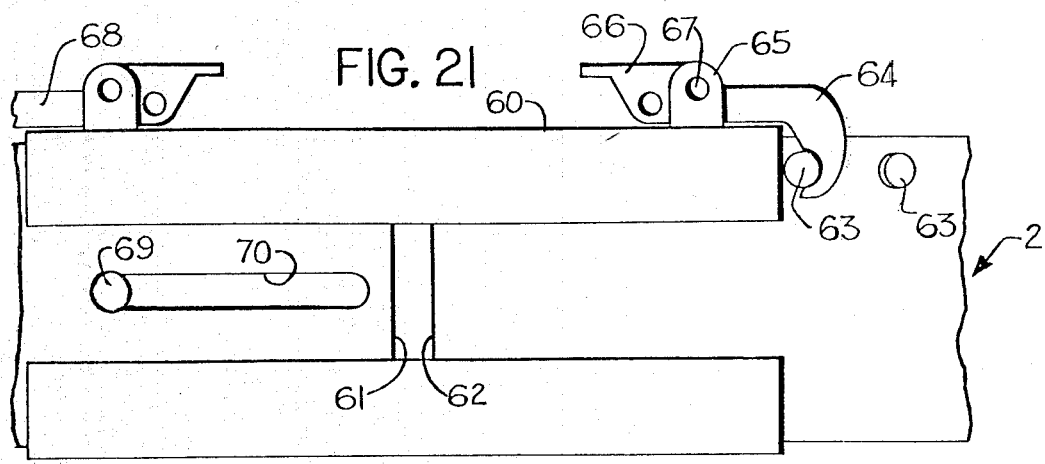

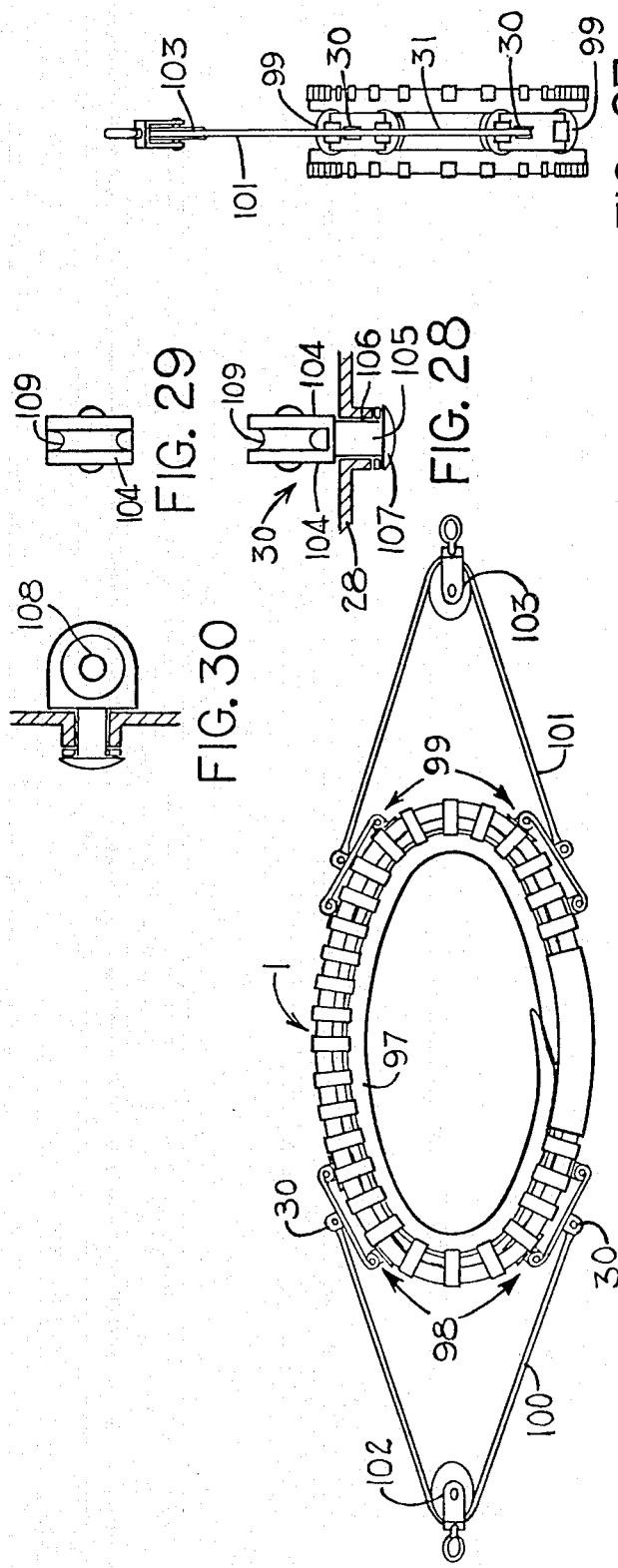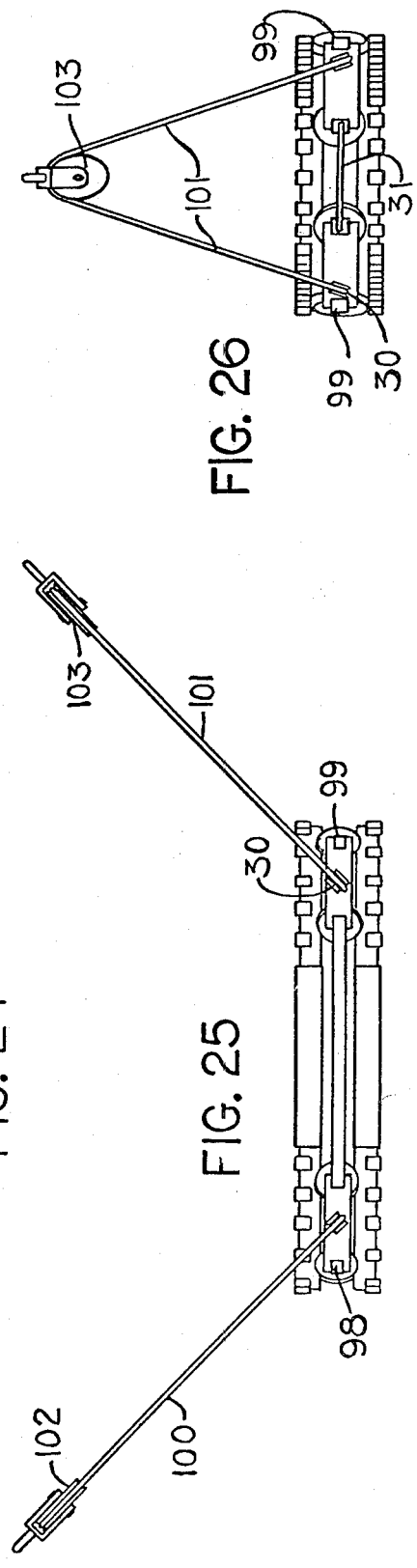

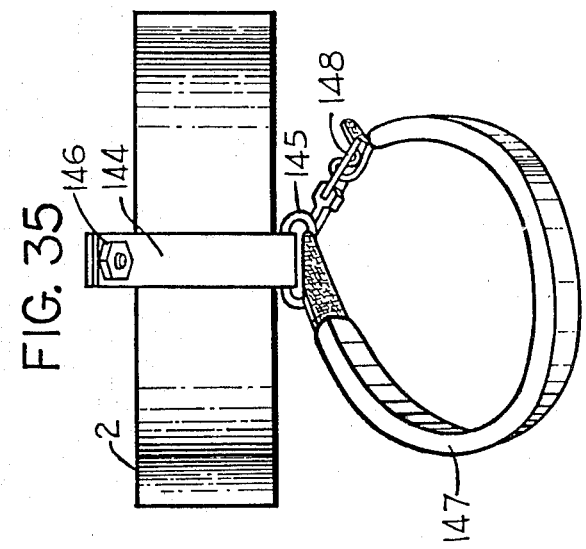
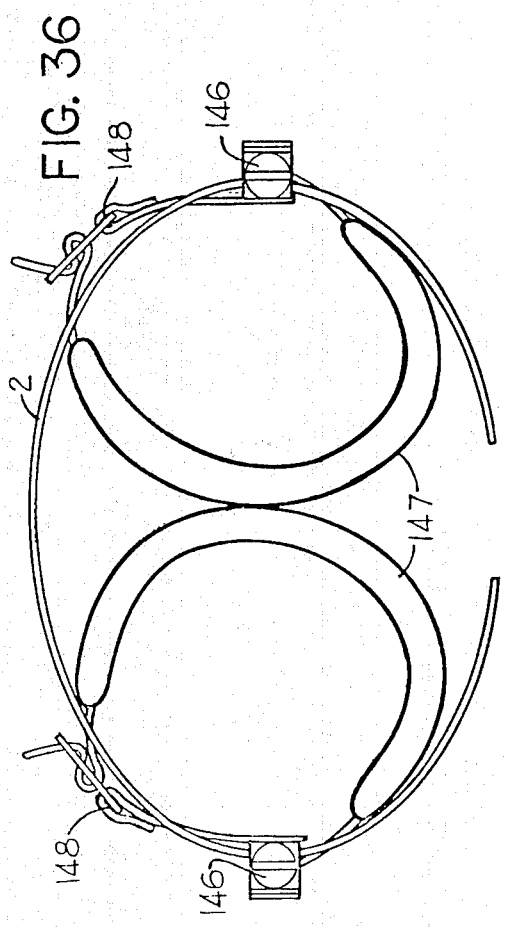
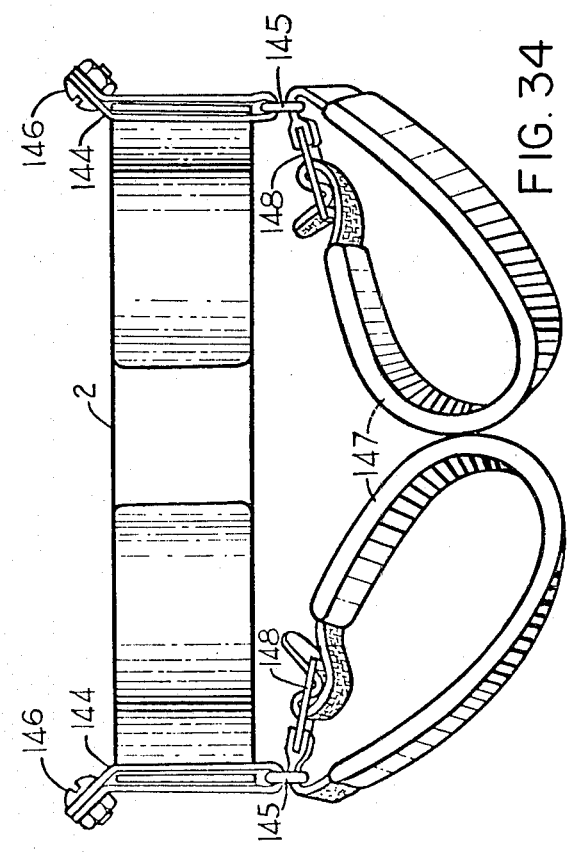

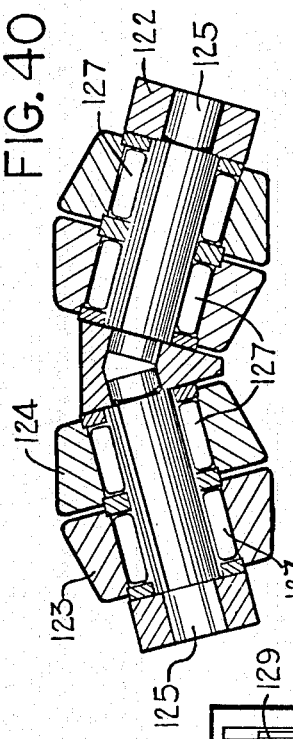
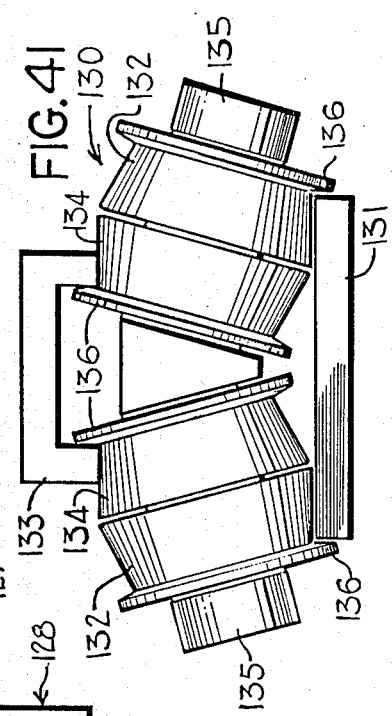
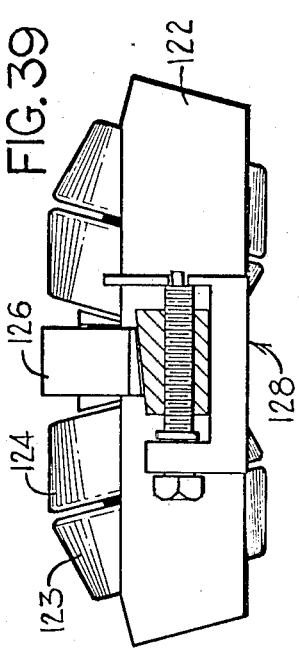
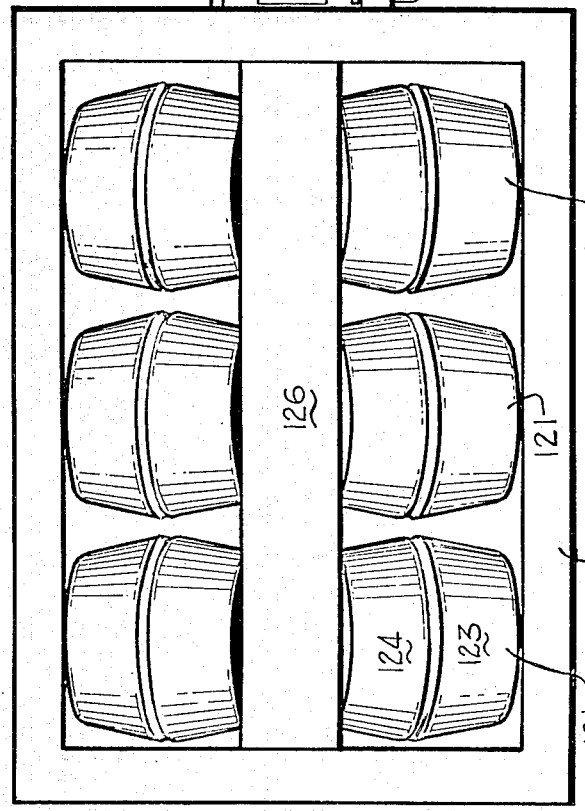
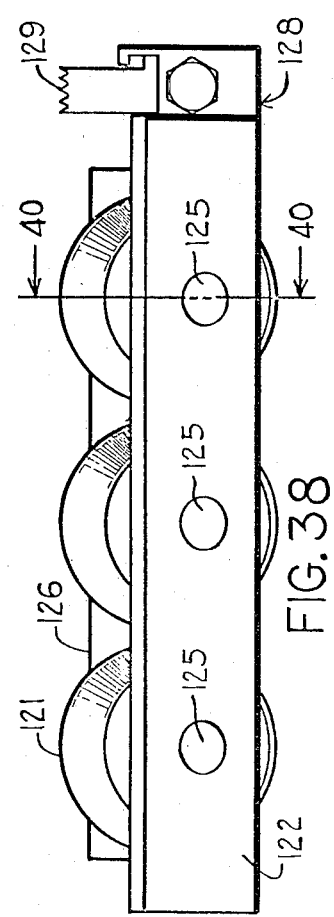

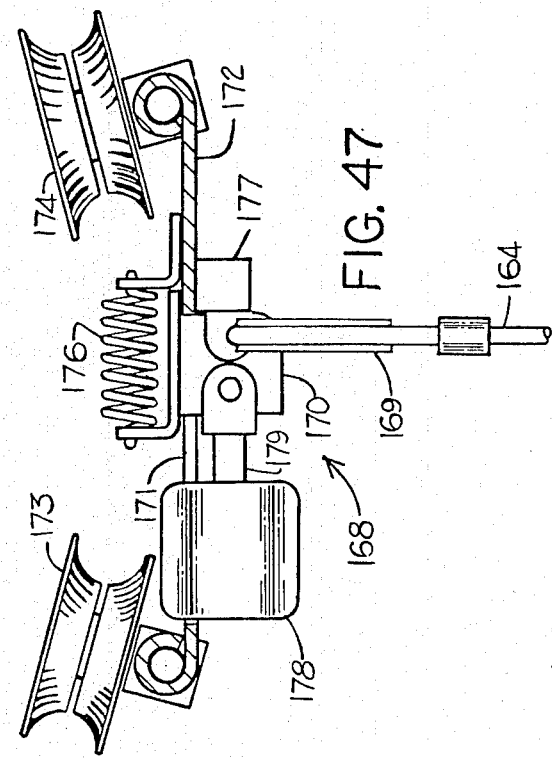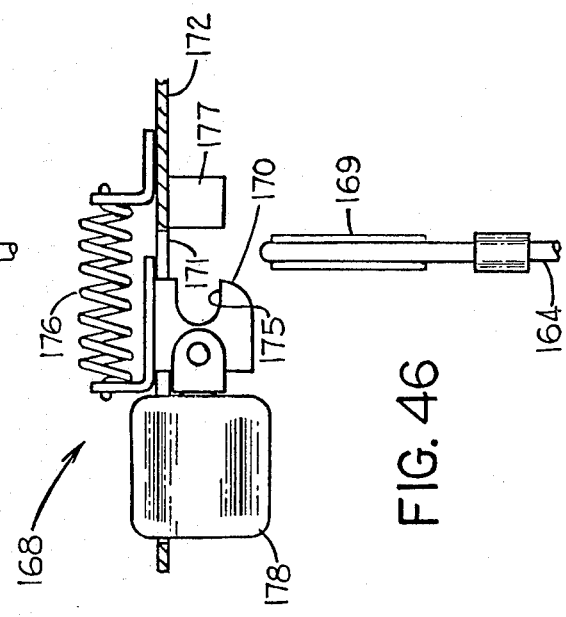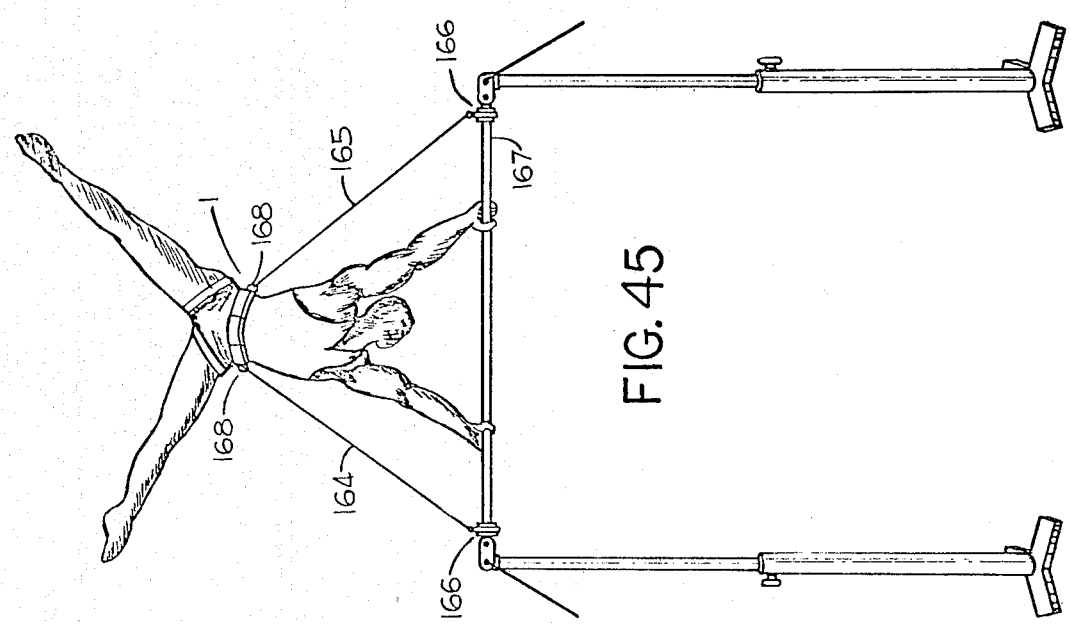

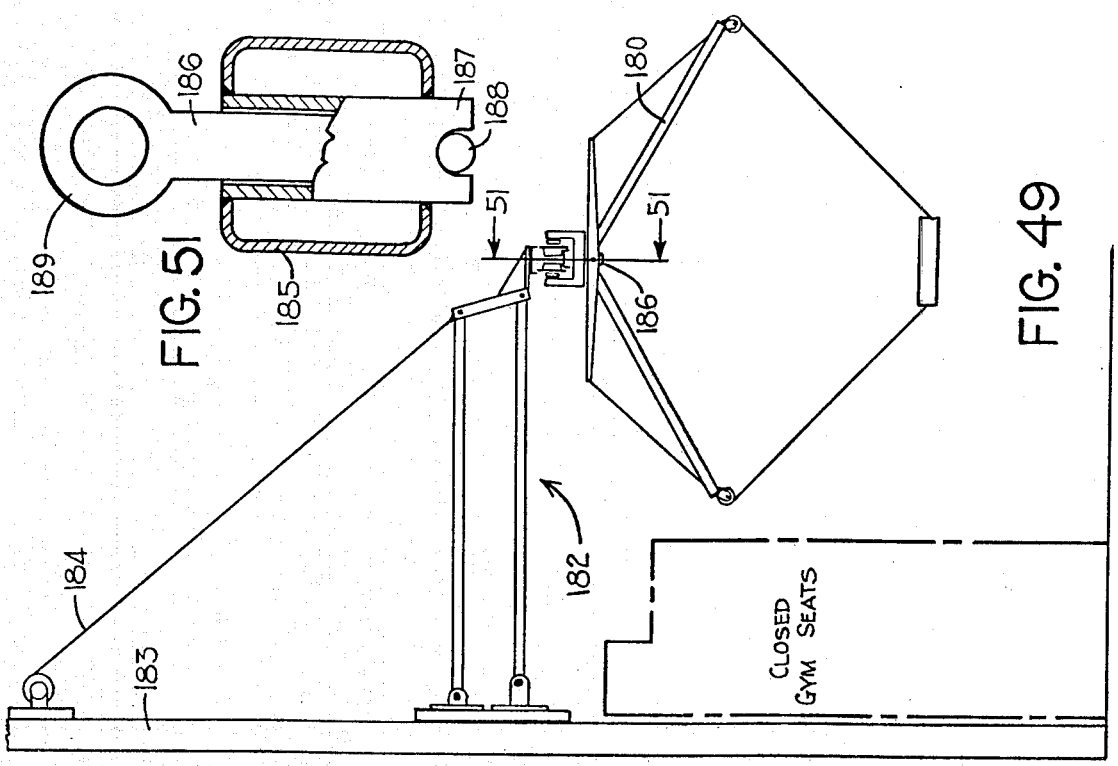
FIG. 51
FIG. 49
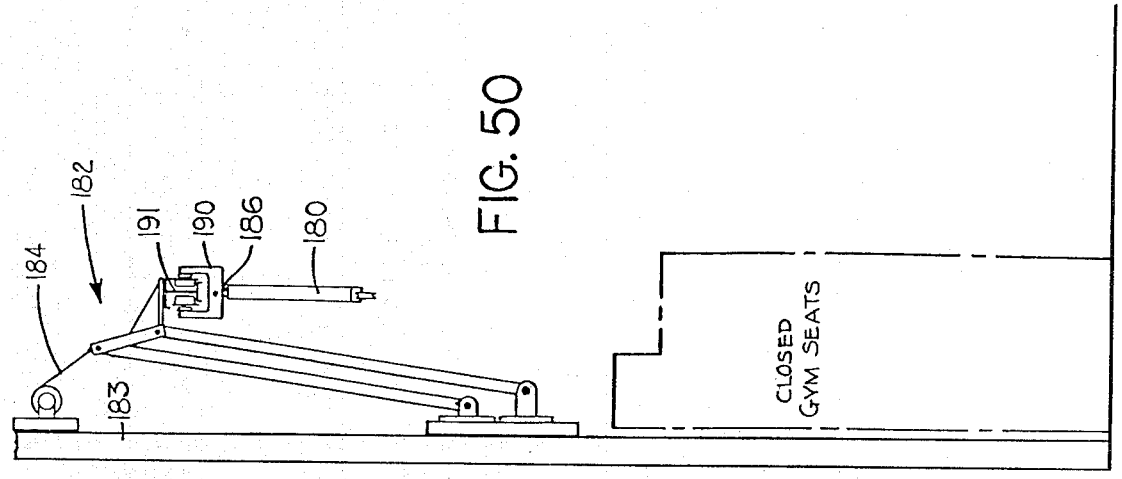
FIG. 50

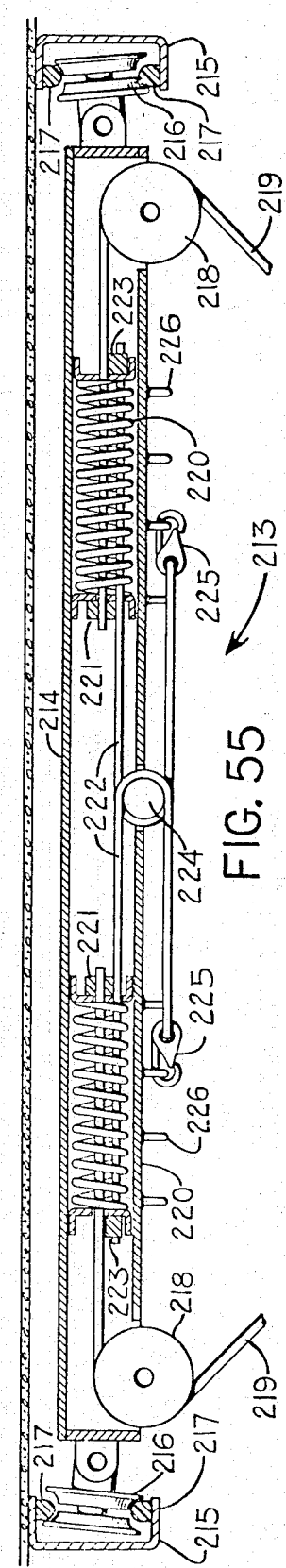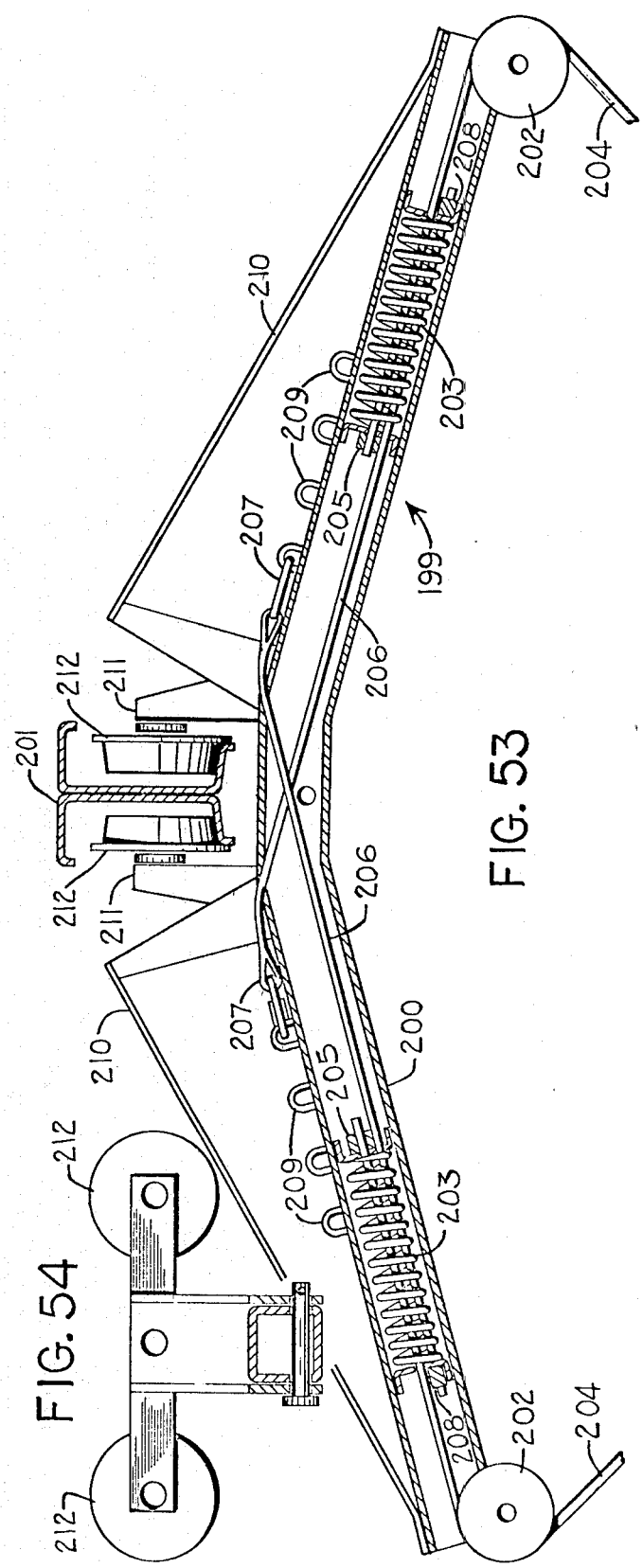

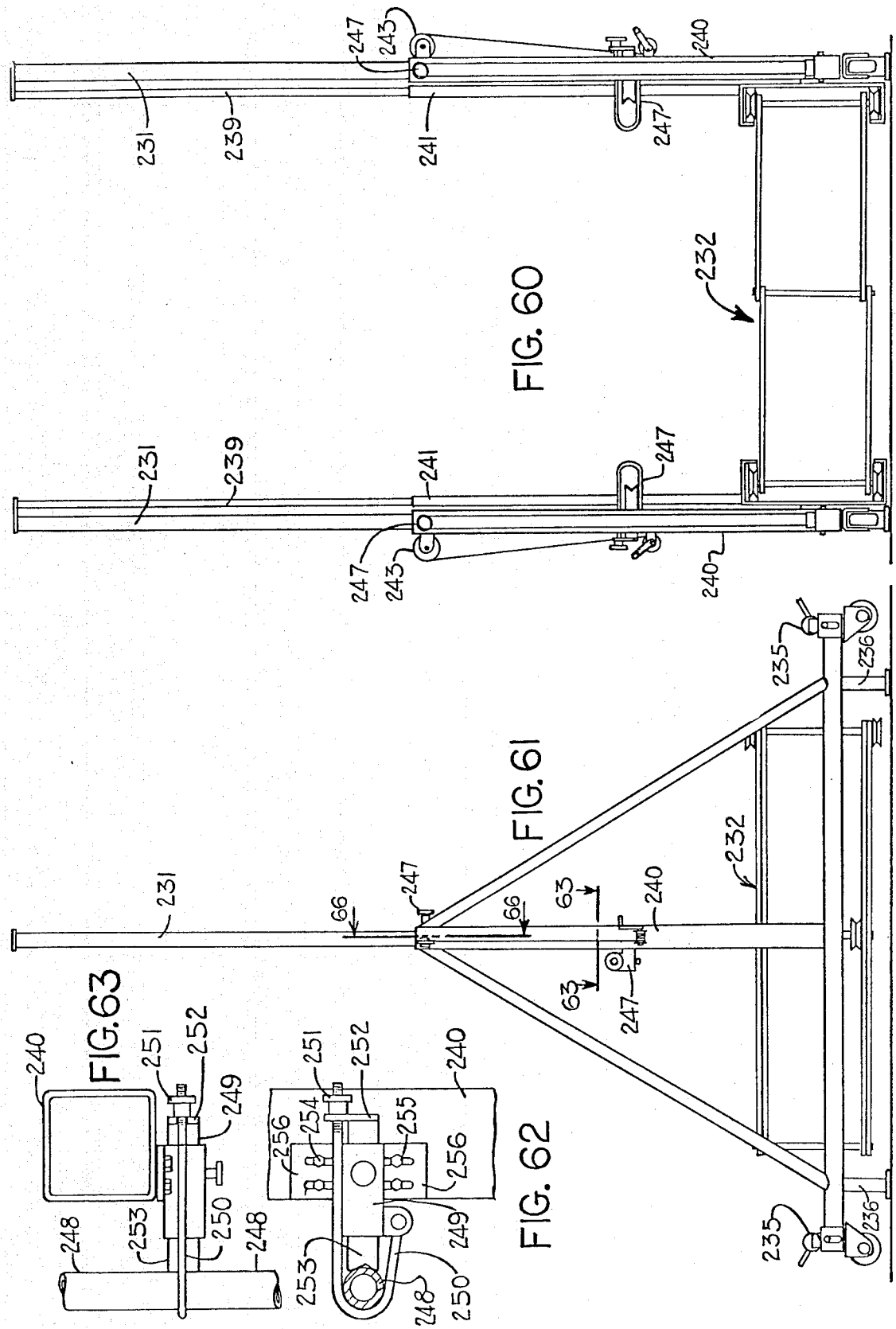

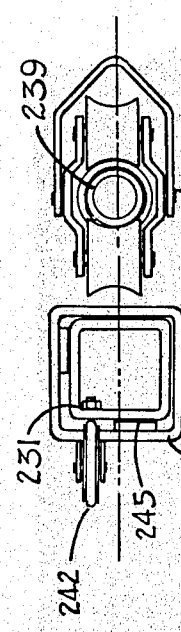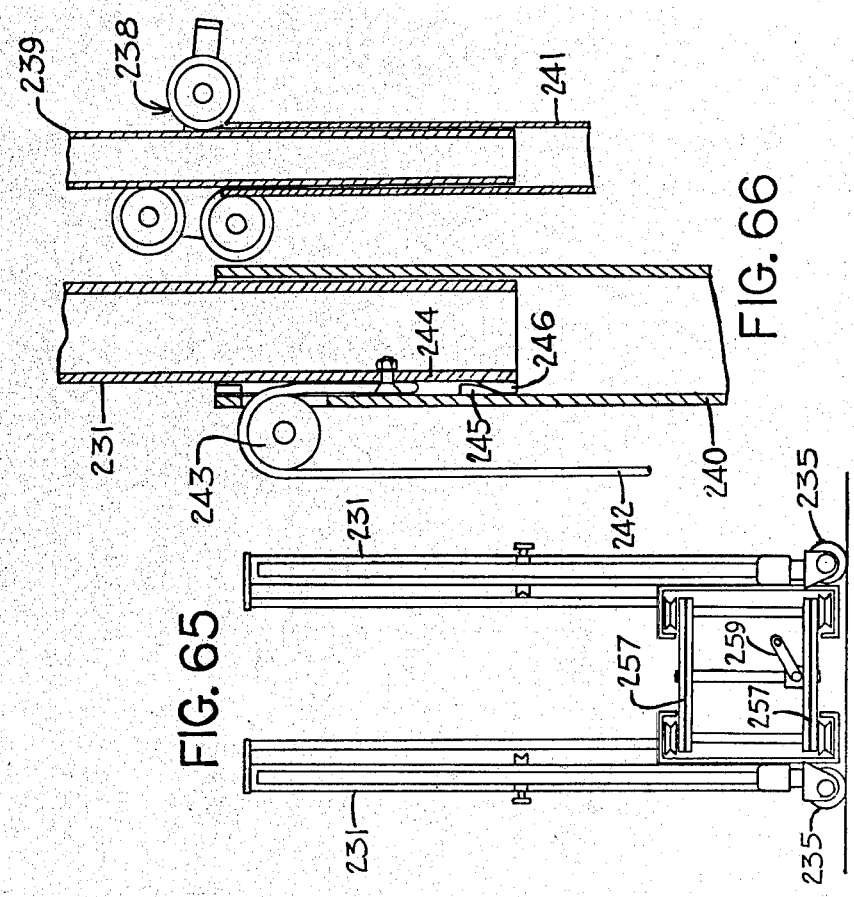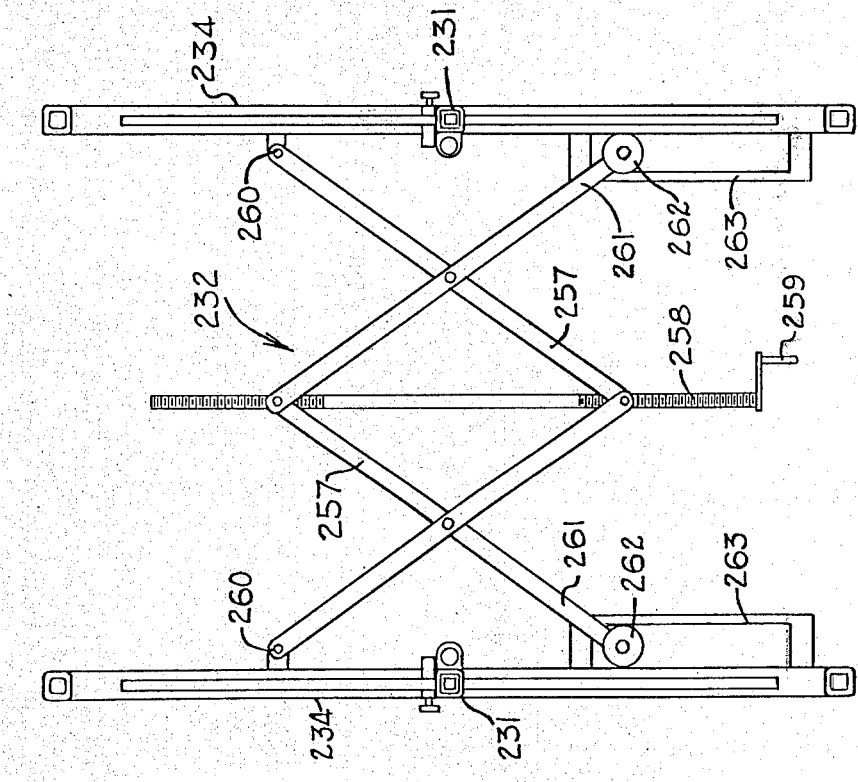

BEARING AND SUPPORT

This is a division of application Ser. No. 842,532, filed Oct. 17, 1977, now U.S. Pat. No. 4,204,719.

BACKGROUND OF THE INVENTION

This invention relates generally to a uniquely designed bearing, and more particularly pertains to a style of counter-rotatable bearing that may be used in conjunction with nonannular or even nonsymmetrical surfaces for providing bearinged support for any item operatively held thereby.

A great variety of bearings are readily available in the prior art and for use in facilitating the movement of a component with respect to discrete surfaces. For example, sleeve, ball, straight roller, tapered roller, thrust, and spherical bearings have long been used for providing generally either a lineal or constant radial movement of one part with respect to its bearing mounting upon near perfect diametrically circular shafts or a symmetrical track or other supportive structure. That bearings have long been used for these types of operations is well known, but the problems associated with the use of bearings for providing nonlineal, inarcuate, or nonannular paths of movement are not available to the art generally because the associated problems of use of bearings for furnishing movement upon a variable curved track have not been solved.

A bearing of the style of this invention, which can best be described as an elastic form of bearing that can conform to even an irregular bearing surface, while having utility in a variety of fields, has found a special value, as for example, in the field of gymnastics in providing a bearinged support that functions not only upon a nonannular surface, but at the same time, has adjustability in its size dimension so as to accommodate a variety of proportions or shapes for the item or user being held. Various attempts have been made to solve the problem of providing a bearing that could be used with a belt of the type employed in instructing and aiding in the methods of training a tumbler, and one such belt is shown in the United States patent to Nissen, U.S. 3,085,357. As can be seen, this patent contemplates the formation of an inner belt having an outer belt slidably associated therewith so that longitudinal turning may be undertaken by the acrobatic student. While this belt was useful for its intended purpose, and comprising one of the earlier models of such belt for use as a teaching aid in tumbling, its lack of true bearing relationship between its inner and outer parts that would reduce the frictional contact between these two components did present a problem during its usage. Efforts were made by others to incorporate some form of a bearing into the belt structure so as to remedy the problem of frictional contact between the stationary belt, and its moveable belt segment, but the variety of movements undertaken by the gymnast while maneuvering presents a great variety of stresses and directional forces acting against the freedom of roller bearing, and therefore, adds to the inutility of the belt other than when a longitudinally made jump and twist combination was undertaken by the performer. This apparatus is shown in the United States Pat. to Pond, No. 2,496,748. Other incidental problems with the Pond style of belt included its being too bulky, thereby interferring with the gymnast's movements, and it could not fit closely and comfortably about the user's waist.

Methods to improve the use of a belt so as to overcome the problem of bearing binding when a variety of body motions are made by the gymnast is shown in the apparatuses disclosed in the United States patents to Murphy (the same inventor herein), said patents being Nos. 3,372,926 and 3,432,163. As can therein be seen, the gymnastic tumbling device as shown incorporates the use of a tumbling and twisting belt that is formed presenting races upon which various designed bearings may ride. While this particular belt, once again, was useful by the gymnast during performance, one of the inherent problems with such a belt is that when multiple motions are made by the gymnast, such as a combined tumble, twist and somersault, there is a tendency for the belt to become reasonably distorted under the influence of the exerted body forces, causing the track to somewhat distort, and thereby effecting some frictional binding between one or more of the multiple bearings associated for riding upon the shown track. Thus, while the gymnast may be performing the combined tumbling and twists, he could feel the drag by reason of the constrained movement of the rollers about the distorted belt track, such as one experiences during usage of the belts shown within these or earlier prior art patents, which therefore does not furnish the complete frictionless movement desired by the gymnast, as when one performs without the use of any auxiliary supportive structure.

It is, therefore, the principal object of this invention to provide a support incorporating cooperating bearings that are free for movement about most of the nonannular surfaces provided by any specially designed race or track, while at the same time, each rotatable member or segment of the bearing undertakes a single path of rotation, and even counter rotation with respect to each other, regardless which form of exercise or movement is undertaken by its user.

Another object of this invention is the provision of a bearing that is free to attain near frictionless movement about a variety of surfaces, even nonannular surfaces, such as ellipsis, rectangles, trapezoids, and even tracks having the configuration of a figure eight, or the like.

A further object of this invention is the provision of a bearing that presents at least a pair of bearing surfaces having independent rotationable movement upon accompanying tracks or races, so that each roller may independently turn, even in opposing directions, with respect to its discrete surface and yet stabilize and secure the retention of the total bearing to the plurality of accompanying tracks.

Another object of this invention is the provision of a bearing having counter rotating rollers, each being in contact with its own race, with one roller being in contact with one race, and clear of the other, while the corresponding roller rides and operates upon the other race.

An additional object of this invention is to provide a bearing that can freely move upon accompanying tracks without resistance even when the tracks may distort when subjected to twisting forces.

A significant object of this invention is to provide a bearing that utilizes counter rotating rollers mounted upon a single axis.

Another object of this invention is to provide a support utilizing a plurality of the aforesaid bearings and which support has a great variety of applications.

An additional object of this invention is to provide a bearinged support for use by the gymnast, as when performing upon the trampoline, balance beam, horizontal bar, or even when tumbling, or for use in conjunction with related type equipment.

Another object of this invention is the provision of a support that has applicability as a cam follower.

An additional object of this invention is to provide a bearinged support that is adjustable in size without detracting from the near frictionless movement of its inherent bearings.

Another object of this invention is to provide a bearing that has applicability for use in the continuous or intermittent motion machinery field.

Another object of this invention is the provision of a bearing that can be incorporated for use in conjunction with treads upon various equipment.

A further object of this invention is the provision of overhead supports for use in conjunction with the bearing support of this invention and for enhancing the ease of adjustability of the equipment used by the gymnast.

Another object is to provide a roller for a conveyor for transferring material around curves and varying elevations, such as a parts conveyor traversing a finishing line, or as through preclean, painting and drying ovens.

These and other objects will become more apparent to those skilled in the art upon reviewing the subject matter of this invention, and upon undertaking a study of the description of the preferred embodiment in view of its drawings.

SUMMARY OF THE INVENTION

This invention encompasses a variety of improvements relating to the field of bearings, supports, and equipment that accompany a support, to render more facile its use and application. An outline of the various facets of this invention would appear as follows:

1. A bearing:
    a. Incorporating same or counter rotatable members.
    b. Said members rotatable about a common axis.
2. The bearings applied in conjunction with a support.
    a. The support having applicability in the field of gymnastics, machine tool, vehicle tread, component holder, invalid rehabilitation and maneuverability, as wheels, as cam followers, as a conveyor or in the dolly, for use in the mining industry, in the automation field, and having many other applications.
    b. The support incorporates a structural member in the nature of a resilient belt, having a series of keepers rigidly attached to its upper and lower edges, a pair of races, rails, or tracks retained by the keepers and suspended a short distance from the belt, with one or more of the aforesaid bearings being roller mounted to the said races for a near frictionless movement therearound, regardless of the amorphous shape of the said races, etc.
    c. The support is separable, so as to allow its installation upon either a person, such as a gymnast, or around components, such as, for example, a log in the forest industry that is to be processed into lumber, or the like; and an adjustable bridging member is operatively associated with the two separable ends of the support to maintain its adjustable closure.
3. In gymnastics, the bearinged support is suspended from a horizontal bar, a crossarm, or a track to furnish support for the gymnast within the parameters of their usual motions made during undertaking acrobatic or other related movements.
    a. The crossarm supporting the cable suspended support incorporates spring means that adds flexibility to the use of the support and provides adjustable distance for the support with relation to the equipment with which it is used, such as the balance beam.
    b. The crossarm is usually roller suspended from a track, and designed for easy longitudinal movement therewith so as to facilitate usage of the support during routine tumbling or balance beam maneuvers.
    c. The suspended track itself is adjustable heightwise so as to facilitate the setting of the suspended support as when used in conjunction with the balance beam, or in routine tumbling operations particularly when a beginner is involved.
    d. The support is also capable of cable suspension from a pair of approximately vertically arranged uprights, or bars, associated therewith, to provide freedom of movement for the gymnast while performing upon, as for example, the trampoline.
    e. All of these suspensions, uprights, or frames used with the support may be collapsible to facilitate its storage.
    f. In the use of the bearinged support for rehabilitation purposes, a particular designed overhead framework adjustably suspends the said support.
        A. The overhead framework includes a pair of crossarms spaced apart by a beam, with said combination being roller suspended from a guiding track suspended from the ceiling, or the like.
        B. The suspended support may be raised or lowered by the invalid, or others, by either manually or motorized movement of a member that, as an example, may threadedly engage with the beam and shift longitudinally therealong for retracting the cables suspending the support and thereby achieve its raising, or when shifted in the opposite direction providing a lowering of the same.

This invention is not necessarily an improvement upon any existing bearing, but rather, sets forth a design concept for a split roller bearing that has heretofore not been available. The bearing, formed of separate rotatable members, with each mounted for independent rotation upon a single shaft, thereby having a coincident axis of rotation, is designed for moving upon a track formed of spaced apart rails or races, so that the one rotatable member contacts one rail, while the other half of the bearing, or the other rotatable member, contacts the other track rail. Thus, and where the rollers are formed having either concave or convex contacting surfaces, they are designed each for contacting their respective race that will likewise have a mating convex or concave complemental bearing surface. Thus, the cooperating surfaces of the separate rotatable members of the bearing are designed for mating and tangential engagement against a corresponding surface formed upon the cooperating races or rails of the track. And, as can be analyzed, as the bearing glides along between the races of its track, each half roller, or the separate rotatable members, will be rotating in opposite directions, since each member is contracting its respective race at a diametrically opposed position from where the other member established contiguity with its respective race.

Thus, in view of the foregoing, the twin rotatable members of each bearing are generally of the counter rotating type, since each rotatable member of the bearing is disposed for rotation upon a single axis. This axis, as will be further analyzed in this application, may comprise a single shaft that extends through a pair of rotatable members, and in order to insure near frictionless movement of the said members upon their single shaft, a series of bearing means, such as ball bearings, roller bearings, and the like, are disposed intermediate the rotatable members and the shaft about which they turn, and in addition, if necessary, another bearing, such as a roller or ball bearing, or the like, may be provided intermediate each rotatable member so as to insure that they do not make contact with each other during member rotation.

The bearing of this invention, as previously analyzed, has application in a great variety of fields, and can be used independently as a bearing per se, or it can be incorporated within other structures, such as the type of support that may be used, for example, by a gymnast while functioning upon various gymnastic equipment. This support is designed generally for embracing the waist or hip portions of the body of its wearer, depending upon just whom is making use of the same, and when adapted for use about the gymnast, it will be disposed in the vicinity of the hips so as to not interfere with his/her normal bending movements while performing the rather strenuous acrobatic routines. On the other hand, where the support of this invention is utilized by, as for example, an invalid, either during rehabilitation, or to help one cope with the daily routine, the bearinged support of this invention may be arranged and located at the vicinity of the waist, since it is not critical that the support be provided directly at the hip pivotal point of the patient. But, for another reason, it is desirable, particularly with respect to the usage of this invention by the invalid, that the support be located somewhat above the identified body midpoint, at the vicinity of the waist, so that the invalid will not experience any top heavy condition, which could lead to a fall from which he would not be capable of rehabilitating him or herself.

The support is designed to be both flexible and adjustable in its configuration, having a variable diameter in cross section, which may even be nonannular of design and capable of accommodating nominal thrust loads. In addition, when the support is in use, as when applied by the gymnast, it will experience a certain degree of twisting movement that can also be accommodated by the unique bearings of this invention, a plurality of which are designed for assembly within the designed support. The support is formed having a structural member around its circumference, and the structural member may be formed as a band, such as of spring steel, and will generally be separable, at least at one location, so that it can be opened as when desired to install the support upon a person or object, and which point of separation also adds to the adaptability of its use so that it can be adjusted to varying circumferential sizes depending upon the dimensions of the person or item supported.

Depending upon the number of separations provided in the structural member, or its band, a bridging member is designed for adjustably connecting to each separate end of the said structural member and capable of fastening and securing the two ends together as when the support is applied. This bridging member is formed in the shape of a slide like clamp, slidably secured to one end of the structural member, with said clamp being disposed for accommodating by means of insertion the opposite and free end of the said member, when the support is installed. The structural member, or band, has a series of keepers rigidly secured around its upper and lower marginal edges, and these keepers are designed for holding the races or rails of the track of this invention. Therefore, it can be seen that it is necessary that the bridging member also provide means for accommodating the ends of these races together when the support is assembled, to provide continuity of rotatable member movement around the support. This is accomplished by the bridging member having a pair of integrally formed tubes approximately aligned with the ends of the upper and lower races, with these ends of the races being insertable within the bridging member tubes and form a continuous track around the support periphery. The bridging member may hold the separable ends of the structural member together by means of any form of fasteners, such as a rack and pinion plus a restraining pawl fixture, which can be used initially for tightening of the member ends together, such as by a forced turning of the pinion upon the belt secured rack, thereby drawing the structural member of the belt tightly within the bridging member of the support, and around the person or item held. Other forms of hook and pin combinations may be applied proximate the bridging member so as to provide means for adjustably securing the structural member ends securely, as when the support is applied.

Through the use of a bridging member in cooperation with the structural member or belt of the support, the circumferential length and size of the support is readily adjustable and variable in dimension. It is of significance though that the ends of the races must extend inside of the bridging member formed tubes at least a reasonable distance, such as a distance equal to the cross sectional heighth of each said race, so that it can act to structurally retain the race within the support, thereby reducing any bending moments at this location, particularly when significant weight is applied upon the support as when it is being used by a person, as one who may be undergoing rapid changing movements, such as the gymnast. In addition, the races need to be inserted some distance within the tubes of the bridging member so as to prevent them from accidentially sliding out of the same as during usage, particularly when exposed to impacting forces. In addition, it may be desirable to apply a cable between the two separate end of the structural member of the support in the event that its ends should become loose during active usage. Thus, this secondary safety means would prevent the support from totally sliding off from the waist of the person using the same.

The twin half rollers as applied upon a single shaft of the bearing are employed, as previously mentioned, in series along the periphery of the aforesaid support. These bearings are designed for riding upon the upper and lower races of the support track, and desirably there is just sufficient clearance formed with respect to the inner and outer races and the bearing, so that the halves of the counter rotating bearing, or its two rotatable members, are kept purposely apart by a sufficient space so that each rotatable member will be in contact both only its respective race at a time, and will not contact both the top and bottom races simultaneously. This is a problem that occurs with many of the prior art type bearings when constructed into a gymnastic belt of this type, and which encounters this undesirable double contact of spaced apart tracks that prevents a free rotation of the bearing. Such occurs with the prior type of gymnastic belts, as previously explained, whereas, the current invention eliminates any more than a single point contact of each rotatable member with respect to a separate race at any given moment. For example, if the bearinged support of this invention is arranged horizontally and a load is applied from the top upon the shaft of the bearinged rotatable members, the applied load will cause the front rotatable member to contact the lower race, while the rear rotatable member will be in point contact with the upper race. And, alternatively, if a load is applied from below, then the front rotatable member will be in contact with the upper race, while the inner rotatable member will change its contact to the bottom race. Thus, the individual rotatable members are in contact with only one single race at a time, thereby preventing their multiple contact which leads to a frictional resistance against movement of bearings of the prior art type.

The support of this invention is designed for being suspended by means of springs, cables, sheaves, and crossarm members, generally that are associated with an overhead form of track, which is and of itself is designed for accommodating longitudinal movement along the same path of movement as the user of the support. This elastic type suspension system is formed through the use of a series of cables, and which cables are applied generally at diametrically arranged locations along the designed support, and allows also for rotation about a horizontal axis of the support, as when such a movement is undertaken by a gymnast. At the same time, the suspension system allows for the support, as applied to the waist of the gymnast, to be rotated around a vertical axis, as when said gymnast may jumb and twist in place. Thus, a variety of movements, and any combination of movements, about the both vertical and horizontal axes can be experienced by this support, free of any frictional resistance, due to the unique design of the bearinged support, and its suspension from the novel overhead frames designed for use in conjunction therewith. Especially designed swivels applied to the bearings of this support, and links that interconnect the same together, allow for this freedom of twisting and tumbling motions by one embraced by the support during its usage. And, various styles of crossarms have been designed to provide for safety of clearance of the suspension cables away from the body of the user, particularly the gymnast, with the said suspension cables in their attachment laterally to the support being arranged generally upwardly and angularly away from the support, and the user, being held apart upwardly thereof by means of one of the aforesaid style of crossarms. These crossarms are generally designed of tubular shapes, having sheaves rotatably mounted at their ends, with the cables arranged around these sheaves and extending into the interior of the said crossarm tubular members. And, to further add to the dexterity of useage of this invention, one or more spring means may be provided within the tubular member of a crossarm, and have the cables connected at particular locations to the said spring means, so that as pressure and weight is applied to the cable the spring will provide a certain degree of give furnishing a slight increase in the length of the cable. This is particularly useful as when the support is being employed by the gymnast, so that as the gymnast rises and falls during tumbling movements the support will freely move therewith without any obstruction, and cushion the free movement of the said gymnast.

The suspended track of this invention is likewise designed for readily accommodating various moves of the supported user, as for example, when it is utilized above a balance beam, trampoline, or even one exercising through a variety of tumbling movements. Thus, as the gymnast moves along the length of the mat or beam, the entire support assembly will shift longitudinally therealong, under near frictionless conditions, so as to add no restraint to the activity of the performer. The suspended track itself may contain one or more rails, as through the use of web connected channels, and may cooperate with additional bearings, even of this inventive design, so as to facilitate the free movement of the overhead crossarm along the length of its track. Or, as an alternative, the crossarm of this invention may be designed having some width, and be bearing mounted at its ends to spaced apart tracks, with each track incorporating an upper and lower rail, which may readily accommodate the style of bearing of this invention, at each end of the crossarm, so as to provide easy and unobstructed movement of the crossarm along their length. In addition, by utilizing this combination bearing supported crossarm and track, the overall heighth required for its installation can be reduced to a minimum, thus allowing installation in low ceiling rooms and even basements.

As is readily known by those skilled in the art, particularly in the acrobatic arts, undertaking exercises upon the trampoline is one of the most dangerous of the exercising arts. In the event that the cushion pads around the frame fail to completely guard against the gymnast, or any of his limbs, from encountering the peripheral structural framework of the said trampoline, or the floor, then serious harm can be done to the gymnast. The trampoline is a maker of paraplegics. At the present state of the art, approximately four persons are required around the periphery of the trampoline to act as spotters, and help break the fall of any gymnast whose performance has gone awry. The support of this invention generally provides a safety suspension that is designed to keep the gymnast from traveling laterally, forward, or backwards, more than a couple of feet, thus keeping the athlete at an approximate central location with respect to the trampoline bed. The suspension and support of this invention will allow the gymnast to rise, fall, rotate, twist, and perform various types of somersaults, and do so with a feel of comfortability, because of the padding contained within the inner segment of this support, and because of the near frictionless movement provided by the various bearings of the design described in this invention, and which are incorporated within this support and some of the suspension structure. The trampoline suspension of this invention includes framework incorporating a pair of columns or uprights, and may contain slightly inwardly disposed vertical bars that are arranged substantially in parallel with the uprights, and are attached at their ends respectively to the same. One is applied to either side of the trampoline, and the suspension cable of this invention, one attaching to either side of this support, extends outwardly for attachment about the said vertical bars. Roller bearings may be provided upon the said bars, having the outwardly disposed ends of the cables attached thereto, so as to provide for free movement of the bearings upon their respective bars, thereby allowing the gymnast supported by this invention to freely move vertically, without obstruction, but yet with the framework retaining the said gymnast within the lateral safety parameters as previously explained. The upward movement of the roller bearings upon their respective bars exert no external force upon the gymnast during his manipulation, but, the support of this invention, at the same time, totally prevents his encountering a missed fall that causes the type of damage as previously explained. The stops at the lower end of the guide bars of this invention are adjustable so as to control how far down the support may move under the influence of the gymnast, and springs may be provided either at the ends of the cables, where they attach to said bars, or upon the bars themselves, below the roller bearings, so as to provide cushioning at the lower range of movement of the support during its usage. Preferably, the support will freely move downwardly to a position of just resting upon the surface of the trampoline, as when not in use, so that the performer can undertake any of the usual trampoline movements that accompany performance upon one of the same. At the same time, the various frameworks of this invention may be designed to fold and be caster supported to facilitate their storage, as when not in use, and movement when being transferred.

Gymnasts also readily perform upon the horizontal bar. The bearings support of this invention is likewise designed for providing full safety to the performer when operating upon such a piece of gymnastic equipment. As is readily known, the period of exercise upon the horizontal bar seldom lasts more than sixty seconds, because of the strenuous activity involved during such a performance. The smoothly operating support of this invention, which may or may not be spring mounted by means of suspension cables attaching approximately to the ends of the horizontal bar, but with their inner disposed ends being swivel connected to the support, allows the gymnast to freely exercise upon the bar, undertaking a variety of movements but having the assurance that he will not encounter any injurious fall in the event of a miss cue. But, at the same time, the gymnast will know while utilizing the support of this invention that he can attain the effortless rotation about the horizontal bar without experiencing any resistance, due to the inherent freedom of movements provided by the support of this invention, as when applied in the foregoing manner. And, as those skilled in the field of acrobatics will acknowledge, a gymnast operating upon a horizontal bar also receives credit for the type and quality of dismount achieved. These are generally called fly-aways. Obviously, being suspended to the horizontal bar by means of the support of this invention detracts from the ability of the gymnast to perform a dismount. Therefore, this invention contemplates the use of a form of electrically controlled disconnect switch or latch that may attach to either side of the support, at the location where its suspension cables connect with the support swivels, so that upon energization of an electric switch as by an observer, the swivels may be disengaged from the support, or their connecting cables, to thereby instantly allow the performer to undertake a fly away, with the assurance that he is free to terminate a performance, after having been fully protected while performing upon the horizontal bar itself by means of the support of this invention.

The balance beam is a gymnastic item of equipment that is generally used by female gymnasts only. It is usually recognized that very few performers in this field become accomplished because of the many falls and injuries that are sustained with the learning and training upon the balance beam. The bearinged support of this invention is designed to allow such training with the assurance of protection against any fall, and the incident injury that results therefrom. This invention is designed for suspending the support from an overhead framework of the type previously analyzed incorporating the crossarm that roller mounts along a length of track. The track will generally be aligned in parallel above the balance beam so that as the gymnast performs along the length of the beam the bearinged support of this invention will allow the somersault and other type of acrobatics to be performed, while the overhead roller track and crossarm combination allows for movement along the longitudinal length of the beam. Thus, full support is provided for the performer while undertaking all aspects of exercise upon this balance beam. Once again, an observer can operate an electrical latch or the like to disconnect the cable suspension so the gymnast can practice her dismounts.

Another significant usage for the overall structure of this invention is in the rehabilitation field. The invalid, or the injured, after prolonged periods of bed retention, or during recovery from an operation or an accident, must have some form of physical therapy. The current practice is for one or more therapists to support the patient as he or she undertakes these initial movements. And, not until after the patient has attained some degree of strength and marginal dexterity is he then placed between two parallel railings upon which he can support himself as he commences to walk. There is no known mechanical appliance presently available upon the market that furnishes the patient complete independence from the use of any therapists for undertaking these beginning exercises. Furthermore, apparently there is no apparatus provided upon the market that can allow the paraplegic to attain freedom from cooperative use of others during individual movement. Thus, the bearinged support of this invention can be designed for movement in conjunction with an overhead framework, supported by a suspended track, that can be arranged around the interior of a home, at ceiling level, or even in the rehabilitation center of a hospital. The support of this invention can be raised or lowered by means of suspended cables from the overhead frame, with the support being placed around the waist of the invalid, even when he may be located in bed, or in a wheel chair, such being performed by himself, with perhaps leg straps, accompanying this support, being fastened around the legs. Either a power of manually operated unit will allow for the raising or lowering of the cables, and its support, to thereby lift the patient to an erect and standing position. If the patient can stand by himself, then the manual type of lifting unit will suffice. The overhead framework of this invention as used in the rehabilitation field includes a pair of crossarms spaced apart by means of a beam, providing a four point positioning of cables at preferably equal distances from the center suspended support, with the patient being located centrally therein. And, a shiftable or moveable means may be provided along the length of the overhead framework spacing beam, and it may be, as an example, threadedly connected therewith, so that as the beam turns, the shiftable member, having the cable ends fastened thereto, will allow for a draw of the cables in one direction, so as to lift the support, or when the said threaded beam is turned in an opposite direction, allowing for the support to be lowered, as when the patient returns to his wheel chair or a prone position in bed. In any event, the patient who may be paralyzed for life can be given significant help by the support of this invention so as to make him or her reasonably self sufficient in his day to day routine schedule, whereas, heretofore he had always required the use of a member of the family, or a nurse maid, to be always nearby and ready to provide the needed able assistance. Thus, the bearinged support of this invention, which as previously analyzed, can entertain near frictionless movement in support of the body weight, is readily adaptable for usage in the therapy field and allow the partial or full invalid to easily turn and maneuver within the same support without having to experience any strenuous exertion that would routinely lead to his exhaustion, indicating a failure of the support, which would occur through usage of the belts and other devices as disclosed in the prior art.

BRIEF DESCRIPTION OF THE DRAWINGS

In the drawings, FIG. 1 provides an isometric view of the bearing and support of this invention;

FIG. 2 provides a plan view of the support shown in FIG. 1;

FIG. 3 provides a side view of the support shown in FIG. 1;

FIG. 4 provides a front view of the support shown in FIG. 1;

FIG. 5 provides a plan view of a modified form of support, incorporating a pair of bridging members for facilitating circumferential adjustment;

FIG. 6 discloses the support of FIG. 5 with its ends being separated as during installation;

FIG. 7 provides a plan view of the structural member, keepers, and races of the support with its bridging member removed;

FIG. 8 discloses a plan view of the support of FIG. 7 when expanded, showing how the races are slide mounted by the keepers to the structural member of the support;

FIG. 9 discloses the support of FIG. 7 when bent into a lineal configuration;

FIG. 10 provides a partial sectional view of the structural member, and an upper keeper and race as taken along the line 10—10 of FIG. 7, this one comprising the single race fixing keeper;

FIG. 11 provides an underside view of a segment of the keeper and support, as at one side, as shown in FIG. 7;

FIG. 12 provides a sectional view of the bearings taken along the line 12—12 of FIG. 1;

FIG. 13 provides a vertical sectional view taken along the line 13—13 of FIG. 1;

FIG. 14 discloses a sectional view of a modified bearing of this invention, which view would be similar to that taken of the bearing shown in FIG. 12;

FIG. 15 provides a plan view of a modified form of support disclosing the upper and lower keepers being integrally formed with a base, and having the races and structural member slidably retained therewith;

FIG. 16 provides a vertical sectional view taken along the line 16—16 of FIG. 15;

FIG. 17 provides a plan view of a modified form of bridging member, such as the type of member as used with the structural support as shown in FIG. 1;

FIG. 18 furnishes a front view of the bridging member as shown in FIG. 17;

FIG. 19 provides a vertical sectional view taken along the line 19—19 of FIG. 18;

FIG. 20 provides a plan view of a modified form of bridging member for use with the support shown in FIG. 1;

FIG. 21 provides a front view of the bridging member shown in FIG. 20;

FIG. 22 provides a front view of the form of bridging member for the structural support as shown in FIG. 1;

FIG. 23 provides a plan view of the bridging member shown in FIG. 22;

FIG. 24 provides a plan view of the bearinged support as suspended by a pair of cables disposed laterally thereof;

FIG. 25 discloses a front view of the suspended support disclosed in FIG. 24;

FIG. 26 provides a side view of the suspended bearinged support as shown in FIG. 25;

FIG. 27 provides a side view of the suspended bearinged support, as shown in FIG. 26, with the support being rotated approximately 90° to undertake a vertical disposition, and horizontally dispose anything suspended;

FIG. 28 discloses one of the swivel connectors for use in holding a suspension cable end to the support;

FIG. 29 provides an end view of the swivel connector shown in FIG. 28;

FIG. 30 furnishes a side view of the swivel connector of FIG. 28;

FIG. 34 shows a front view of a modified form of leg strap assembly securing with the structural member of the support;

FIG. 35 provides a side view of the modified leg strap assembly as shown in FIG. 34;

FIG. 36 discloses a plan view of the modified leg strap assembly as shown in FIG. 34;

FIG. 37 provides a plan view of a dolly or conveyor incorporating the style of bearing of this invention;

FIG. 38 provides a side view of the invention as shown in FIG. 37;

FIG. 39 provides an end view of the invention as shown in FIG. 38;

FIG. 40 provides a vertical sectional view of the invention as taken along the line 40—40 of FIG. 38;

FIG. 41 provides a sectional view of a modified form of bearing of this invention as utilized in a conveyor;

FIG. 45 provides an isometric view of a gymnast functioning upon a horizontal bar and suspended by means of the support of this invention;

FIG. 46 provides a side view of the release mechanism connecting a cable to the support of the gymnast, as shown in FIG. 45;

FIG. 47 discloses a partial plan view of the latch mechanism of FIG. 46 releasibly connecting to the bearings of a support;

FIG. 49 provides a view of the cable suspension means and track cantilevered supported from the wall of a gymnasium;

FIG. 50 provides a similar view to that of FIG. 49 with the cable support and crossarm being folded into its inoperative and storage position;

FIG. 51 provides a view of the swivel mount for the crossarm as taken along the line 51—51 of FIG. 49;

FIG. 53 provides a sectional transverse view of the type of crossarm as shown in either the FIG. 48 or 52;

FIG. 54 provides a side view of one side of the track roller suspending the crossarm as shown in FIG. 53;

FIG. 55 provides a transverse view of a modified form of a crossarm for suspending the support of this invention;

FIG. 60 provides a front view of the cable suspended support and frame of this invention, as also for use in conjunction with the trampoline;

FIG. 61 provides a side view of the frame member as shown in FIG. 61, and more clearly showing the stationary erection of the frame member through elevation of its maneuverable rollers off of the ground;

FIG. 62 is a view of the trampoline holding clamp of the frame shown in FIG. 60;

FIG. 63 is a plan sectional view of one of the frame uprights taken along the line 63—63 of FIG. 61, and also showing the trampoline holding clamp;

FIG. 64 provides a plan view of the foldable brace of the frame member as shown in FIG. 60;

FIG. 65 provides a view of the folded frame member of FIG. 60, as when readied for storage as during non use.

FIG. 66 provides a vertical sectional view of the height adjustment means of an upright and the bearing upon its parallel bar, taken upon the line 66—66 of FIG. 61;

FIG. 67 is a top view of the means shown in FIG. 66;

DESCRIPTION OF THE PREFERRED EMBODIMENT

Figure 1:
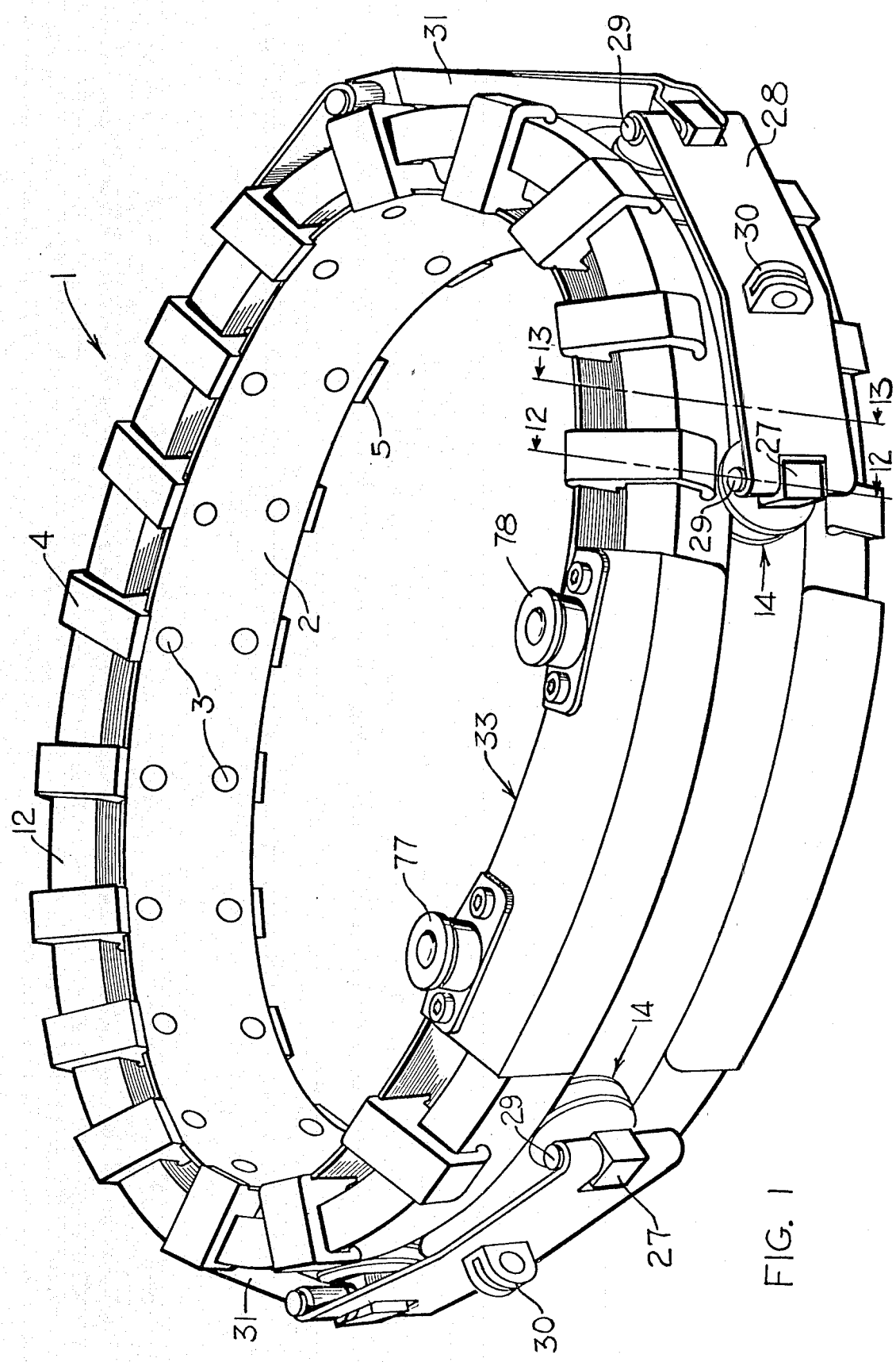

By referring to FIGS. 1 through 4 of the drawings, the bearinged support of this invention is disclosed fully. As can be seen, the support 1 is generally of an enclosing configuration, being either annular, or nonannular in circumference, and as can be seen in FIG. 2, generally undertakes an elliptical shape preferably for ready adaptation to a form or to the torso of the body. The support includes an inner structural member 2, which is generally shaped in the form of a band, and preferably will be made from some form of a metal, such as spring steel, or even a hard resilient plastic, thereby allowing some flexibility but yet stable support when applied in usage. Although it is not shown, some form of padding may line the interior surface of the structural member 2 so as to insulate the body or held component from contacting the structural portions of this support. Fixedly attached to both the upper and lower ends of the structural member 2, as by means of the plurality of fasteners 3, such as rivets, are the upper and lower series of keepers 4 and 5, respectively. These keepers may be either rivet applied to the structural member 2, or they can be snap connected to the said band by means of their integral connectors 6 and 7, and snap fastened through the apertures 8 and 9, respectively, as can be seen in FIGS. 12 and 13. The keepers generally extend upwardly and forwardly of the structural member 2 of the support, and each is formed having a pair of rails or guides, as at 10 and 11, and which are designed for accommodating the grooves of the support and lower races 12 and 13, respectively, of this support track. These races 12 and 13 may be either convex shaped, as shown, or perhaps can even be concaved in their design, but are generally disposed extending towards each other so as to accommodate one of the bearings, as at 14, of this invention. And, because of the forward extension of each keeper away from its structural member 2 of this support, the races 12 and 13 are provided having sufficient clearance between them and the structural member 2 so as to prevent no obstruction to the disposition of the bearings 14 upon the same.

Each bearing 14 is designed having a pair of inner and outer rotatable members 15 and 16, respectively, which are designed for rotating about a common axis. In this particular instance, a shaft 17 is arranged centrally through the rotatable members, and furnishes that common axis about which the rotatable members may rotate. A sleeve 18, such as of a low friction material, as a plastic, nylon, or a Teflon, or even metal, may be formed around the circumference of the shaft 17, and held thereto by means of the series of bevels, as at 19, and provide an inner race upon which the ball bearings 20 may revolve, while said bearings also are in contact with the inner grooves 21 formed upon the interior surfaces of the rotatable members 15 and 16. Obviously, while ball bearings 20 may be shown therein, other forms of bearings, such as roller bearings, or the like, may be applied for furnishing near frictionless movement to the rotatable members 15 and 16 of the bearing. Snap seals, such as at 22, may be provided exteriorly of the ball bearings 20 so as to prevent the entrance of any deleterious particles, such as dust, thereto.

As can be seen, the contact surfaces 23 through 26 are generally designed for matingly engaging the designed exterior surface of their respective races 12 and 13. And preferably, these surfaces are designed as such that only one portion of said surface, as at 23 or 24, of the rotatable member 15, will be capable of contacting one of the races 12 and 13 at a time, and likewise, only one part of the surface, as at 25 or 26, of the rotatable member 16, will be capable of contacting only one of the races 12 and 13 at a time. Thus, as can be seen in FIG. 12, as when a pressure is applied from below the bearing and thereby lifting it up, the lower surface 24 of the rotatable member 15 will be in contact with the race 13, while its upper disposed surface 23 will be free from any contact with the race 12. Likewise, and simultaneously, the upper surface 25 of the rotatable member 16 will be in contact with the upper race 12, while its lower disposed surface 26 will be cleared from any contact with the race 13. Thus, when the bearing is maneuvered into the position as shown in FIG. 12, the inner rotatable member 15 will rotate in one direction, while its outer rotatable member 16 will rotate in a counter direction. And, as can be seen in FIG. 13, just the opposite condition can prevail, as when a load is applied upon the bearing from above. In this particular instance, the upper disposed surface 23 of the inner rotatable member 15 will be in contact with the upper race 12, while its lower disposed surface 24 is cleared from any contact with the race 13. But, at the same time, the upper contacting surface 25 of the outer rotatable member 16 will be free from any contact with the race 12, while its lower disposed contacting surface 26 will be contiguous against the lower race 13. When this condition prevails, the rotatable members 15 and 16 will each be rotating in opposite directions from that which prevails when they are in the condition that is shown in FIG. 12. Obviously, these upper and lower contacting surfaces 23 and 24 of the rotatable member 15, while being described as separate surfaces, actually form the integral continuous bearing surface for the entire rotatable member 15. The same condition prevails with respect to the upper and lower disposed contacting surfaces 25 and 26 of the outer rotatable member 16.

Extending integrally exteriorly from the axial shaft 17 is an extension 27 which provides an exteriorly disposed mount to which various other instrumentalities may connect, as will be subsequently described.

As once again can be seen from FIGS. 1 through 4, these extensions 27, of each bearing, are designed for pivotal connection by a link 28, and which link is held thereto by means of the pivot pins 29. And, rotatable connected approximately at the midpoint of each link 28 is a swivel 30 and to which the various suspension cables of this invention generally connect as when this support 1 is to be suspended for operable usage in one of the manner as previously defined. As can further be seen in FIG. 2, a variety of these paired bearing combinations, held together by links 28, may be provided around the circumference of the support, so as to attain a spaced relationship between these bearings and to provide spaced and full suspension of the support around its perimeter. Furthermore, and although it is not shown, a connecting cable may be secured between these various laterally paired bearing combinations so as to maintain their spaced relationship as shown in FIG. 2, and to prevent their clustered accumulation at any particular location along the circumferential length of the support.

As can further be seen in FIG. 1, where there are two pairs of the bearings 14 provided to either side of the support, and with each bearing being spaced apart by means of the links 28, it is yet desirable to provide means for spacing each pair of bearings, at a side, apart a particular distance. Therefore, a spanner 31 is provided to either side of the support and is pivotally mounted to the proximate pins 29 of each side pair of bearings, and thereby provides the means for spacing said bearings apart, and also, to prevent their aforementioned clustering. And, as can be seen in FIGS. 5 and 6, where a plurality of bearings 14 are provided around the support, a series of spanners 32 are required for maintaining the bearings spaced apart a fixed distance. In addition, and although it is not shown, a cable or some other form of means, as previously mentioned, may be provided between each pair of bearings so as to maintain their spaced relationship around the periphery of the support, as shown in these previously explained figures of the drawings.

As can also be seen in FIG. 6, the support will be separable at least at one location around its circumference, and as also disclosed in FIG. 1, a bridging member 33 is provided for furnishing the means for holding the separate ends 34 and 35 of the disengaged support together. Or, in the alternative, and to facilitate the application of this support, and as shown in FIG. 5, a pair of bridging members 33 and 36 may be provided at diametrically disposed positions around the support, so as to make the said support totally separable as during application, and to double the adjustment length.

As shown in FIG. 19, each bridging member is designed having a back wall 37 that is formed integrally having upper and lower forward extensions 38 and 39. A pair of angles 40 and 41 are provided secured to the inner surfaces of the respective extensions 38 and 39, and they are spaced outwardly of the back wall 37 so as to provide a convenient space into which the free end 42 of the structural member 2 may insert therein for retention during tightening of the bridging member upon this support, in addition to providing structural support at these locations. (See also FIG. 6). Connecting proximate the upper edge of the end 42 of the structural member 2 is a rack 43. See also FIGS. 18 and 19. This rack is designed for being engaged by a pinion 44 pivotally secured to the mount 45, with the pinion extending through a slot 45 provided through the top of the bridging member, proximate one end, so that the pinion 4 may undertake a mating engagement with said rack 43. Thus, a turning of the pinion 44 in one direction provides for a draw in of the rack 43, and its secured free end 42 of the structural member, so as to achieve a tightening of the support at this location, and its retention about the person or item around which it is disposed. A pawl 47, which incorporates integrally a pusher, has its integral extending shaft 48 spring mounted within the housing 49, with said spring constantly biasing the pawl 7 into engagement with the teeth of the pinion 44, so as to prevent its turn once it has secured the end 42 of the structural member within the bridging member 33. As can also be seen, the opposite end of the bridging member 33 furnishes a somewhat oppositely disposed rack and pinion combination, with the pinion 50 engaged by the pawl 51 which is spring biased to its housing 52 for engaging a rack (not shown) provided upon the other end, as at 53, of the structural member 2. Actually, this end 53 of the structural member is designed for only limited adjustability with respect to the bridging member 33, and this is attained by means of the disposition of a slot 54 formed through the end 53 of the said member 2, and which has a pin 55 disposed therethrough, which pin is rigidly secured approximate the back wall 37 of the said structural member. Therefore, and as can be seen, the end 53 of the structural member will have the bridging member held to it to prevent it from disengaging totally from the belt or support. In any event, at least this end of the structural member also has some adjustable feature to it so that once a major adjustment is made by means of the pinion 44, perhaps a more fine adjustment can be made by means of operation of the pinion 50. But, in the preferred embodiment, the adjustment that can be made at both ends of the bridging member will be the same. Or, and as can be understood, the adjustable relationship provided by both rack and pinion combinations, at either end of the bridging member, provides a greater variation in the tightening of the support about a person, and therefore, the support can accommodate a wider range of body proportions by means of this dual adjustment.

While it is important that the free ends 42 and 53 of the structural member be adequately supported by means of the bridging member 33 of this invention, it is equally critical that the races 12 and 13 be fully supported by means of the same bridging member, preferably by means of some thin wall type of structure so that as the bearings encounter the vicinity of the bridge, they will yet freely turn therearound without any noticeable or frictional obstruction. To achieve this, a pair of upper and lower tubes 56 and 57 are rigidly secured by means of the forward lips 58 and 59 of the extensions 38 and 39, respectively, and also secure at their inner edges by means of the previously identified angles 40 and 41. These tubes 56 and 57 are of thin walled structure, and provide interior openings that are only slightly larger than the outer contours of the aforesaid defined races 12 and 13. Thus, when the support separate ends are brought into closure, the races 12 and 13 enter respectively into their upper and lower tubes 56 and 57, are firmly held therein, at some distance, at least a distance equivalent to the thickness of the said races, as previously mentioned, and thereby firmly secure the said races into a closed loop thereby allowing for the bearings to conveniently pass repeatedly and entirely around the circumference of the support without obstruction.

As can be seen in FIGS. 20 and 21, a different style of bridging member 60 is furnished for holding the separate ends 61 and 62 of the structural member 2 together. This bridging member is of different design, and functions differently as the previously analyzed bridging member for attaining the same results, and that is to secure and firmly hold the loose ends of the support together after it has been installed and adjusted, preventing any of the significant impacting forces exerted upon the support, during usage, from attaining its accidental opening. In this particular embodiment, each separate end of the structural member 2, proximate its upper edge, contains a series of aligned pins, as at 63, while the upper surface of the bridging member is formed having a hook 64, which is pivotally secured to the mounts 65, with the hook being disposed for engaging around one of the pins 63 after the support has attained a snug and tightened position around a person or object. The hook is further provided rearwardly thereof with a finger contacting surface, as at 66, so as to facilitate the pivoting of the said hook, and a spring (not shown) may be provided upon the pivot pins 67, which secures the said hook in place, so as to constantly bias the hook into a downward disposition firmly retaining it around its grasped pin 63. A similar type of pin engaging hook 68 is pivotally secured at the opposite end of the bridging member 60, and functions similarly with respect to the free end 61 of the structural support 2. And, once again, a pin 69 secures to the back wall of the bridging member 60, and is disposed through a formed slot 70 provided proximate the end 61 of the member 2, so as to allow for the same degree of adjustability between this end of the support and its bridging member 60, but preventing a total disengagement of the two said parts.

Yet a further modification to the form of bridging member that may be utilized with this invention is disclosed in FIGS. 22 and 23. As can be seen, the bridging member 71 includes a rear wall 72 having the race accommodating tubular member 73 and 74 integrally connected therewith. The two separate ends 75 and 76 of the structural member 2 are disposed for retention within the bridging member by means of the releasable fasteners 77 and 78, as shown operatively associated with each of the ends 75 and 76, respectively, of the structural member 2. Each releasable fastener includes a detent 79 that extends through an aperture formed in the upper surface of the bridge, and has an integral shaft 80 connecting with a finger grip 81 formed above and exteriorly of a housing 82 of each member. Spring means 83 normally urges the detent or pawl 79 downwardly into the bridging member, where it may engage within one of the notches, or arranged serrations, as at 84, formed within the upper edge of the structural member 2. A simple lift of the finger member 81 allows the detent 79 to disengage from within the aligned seration 84, thereby allowing the end 76 of the structural member 2 either be released, or even further inserted within the bridging member 71 for a more tight adjustment. And, as can be seen, as previously explained, a similar type releasable latch 77 is furnished at the opposite end of the bridging member 71, and functions in the manner of a mirror image to the structure of the releasable latch 78 just analyzed. Once again, a pin 85, as connected with the bridging member 71, extends through a slot 86 provided at the end 75 of the structural member 2 so as to furnish equivalent but fixed adjustment at this end of the combined structural and bridging members of this invention. This is also the style of releasable fasteners 77 and 78 shown in FIG. 1.

In referring to FIGS. 7 through 9, it can once again be seen that the support 1 is separable, as shown in FIG. 7, can be expanded outwardly to a dimension that allows for its free wrap around the waist of a person or the circumference of any object, as can be seen in FIG. 8, or can be bent out to a lineal disposition, as shown in FIG. 9. Furthermore, and as also be seen from the relative dispositions of the various components of the support, as shown in these Figures, as the said support is expanded from a circular to a lineal disposition, a relative displacement of the races, the upper race 12 being shown, changes its position with respect to each of the keepers of this support, such as the upper keepers 4, as shown. While these upper keepers 4, as shown, in addition to the lower keepers 5, are rigidly secured to the structural member 2, in a manner as previously explained in the description provided for FIGS. 12 and 13, the races 12 and 13 must be free to slide within the grasp of their respective keepers in order that this adjustable openability of the support can be made. Thus, as shown in FIG. 7, when the support is maintained in an annular, or elliptical, configuration, the ends, as at 87, of the structural member 2, are, or would appear, to be of equivalent length with respect to the ends, as at 88, of the race 12. But, as the support is widened in its openness, as shown in FIG. 8, these ends 87 and 88 of the structural member 2 and race 12, respectively, undertake offset dispositions. And, as clearly shown in FIG. 9, this offset relationship of the free ends of the structural member 2 and the race 12 can be seen in its greatest divergence. This relationship prevails because the race 12 is only secured at one point to the structural member 2 by means of the fastener 89 which secures it to the central keeper 4 of the support. This fastening relationship is also shown in FIG. 10.

A modification to the style of fabrication of the support of this invention is envisioned, and provides structure that operates only slightly differently from that previously explained, but is intended to provide the same results in operation. By referring to FIGS. 15 and 16, essentially, the keepers are designed as being integrally formed together, and as shown, the upper keepers 90 are integrally connected by means of the wall 91 with the lower keepers 92. And, this wall 91 may be of sufficient thickness and have an inherent resiliency, but yet sufficiently structurally supportive, so as to form the entire integral structural member for this support, or it may be formed having rearwardly extending upper and lower guides 93 and 94 and into which the structural member, or band 2, may slidingly insert. But, in order to accommodate the opening of the support as when its bridging member 95 is disengaged, at least from one separable end of the support, as previously explained, a series of spacings, as at 96, are provided between each keeper so as to enhance the flexibility of the support as when it is opened, in the manner as just previously explained with respect to the support as shown in FIGS. 7 through 9. And, the keepers 90 and 92, at their forwardly extending portions, are designed similarly to the previously explained upper and lower keepers 4 and 5, so as to be able to retain the races 12 and 13 respectively within their grasp.

Thus, as can be seen, as from the explained figures, most of the components of the support may be formed integrally, either from a resilient plastic, or an elastomeric material having a high durometer hardness, but yet having inherent resiliency, so as to ease both the manufacture and assembly of the support in addition to its usage.

In referring to FIGS. 24 through 27, the support 1, when installed, contains the inner padding 97, that is useful for cushioning and spacing the occupant from the rigid operational components of the same. And, the pair of bearings, one pair being shown at 98, and the other pair is shown at 99, are disposed at opposite sides of the support 1, and spaced apart by means of the spanner 31, as can be seen in FIG. 26. Cables 100 and 101 are designed for securing respectively to the bearing pairs 98 and 99, with the ends of the cables being secured to the link swivels 30 as shown. A pulley, one at each side as shown at 102 and 103, is disposed spacedly and laterally from the sides of the support 1, and are suspended by further cables as will be subsequently analyzed. But, these cables 100 and 101 are arranged angularly away from and upwardly from the support 1, and thereby provide adequate clearance for passage of the limbs of the user, as when the gymnast functions during usage of this support, so as to prevent unobstructed and freedom of movement of said party during a performance. Thus, the cables 100 and 101 are freely shiftable within their respective pulleys 102 and 103, so that while the gymnast may be standing erect, the support will undertake the disposition shown for it in FIGS. 24 through 26, but that when a somersault or tumbling motion is commenced, the support will then pivot about a horizontal axis and undertake, momentarily, the disposition shown for it in FIG. 27. At that time, the cables 100 and 101 will vary in their relationship with respect to the support 1, and also shift about their respective pulleys 102 and 103, such also requiring a slight pivot of their respective swivels 30 about their bearing pairs.

Each swivel 30 includes a pair of mounts 104 integrally connected with a pin 105 and which pin inserts through an aperture 106 formed through their respective links 28. The head 107 formed upon the pin 105 and which pin inserts through the said aperture 106 assures retention of the swivel in place. Disposed between the amounts 104 and rotatably connected thereto by means of the pin 108 is a sheave 109. Thus, the cable ends are affixed about their respective sheaves 109 so as to insure free movement of the cables with respect to the swivels when the support is undertaking a variety of turning movements.

Before a detailed discussion is undertaken with respect to the specific usage of the bearinged support of this invention, as for use by gymnasts, a handicapped person, or the like, perhaps, comment can herein be made regarding a slight modification that can be constructed into the bearing of this invention. As can be seen in FIG. 14, the bearing 110 includes a pair of rotatable members 111 and 112 that are bearing mounted, by means of the ball bearings, as at 113, for rotation about the shaft 114 as shown. The shaft 114 includes a pair of race members 115 and 116 reasonably secured around it, and additional bearings, as at 117, cooperate with various bearinged surfaces formed inwardly of the rotatable members 111 and 112 so as to insure their independent but bearinged rotation with respect to the shaft 114. Thus, because of the uniquely designed interior portion of the rotatable members 111 and 112, with their bearinged surfaces, and their cooperation with the ball bearings 113 and 117, as shown, each rotatable member can rotate independently of the other, and even have counter rotation abilities during usage of this bearing. The rotatable members 111 and 112 are designed for rolling upon their respective upper and lower races 118 and 119, as shown, so that, as can be seen in FIG. 14, while the rotatable member 111 is in engagement with the upper race 118, it rotates in one direction, while at the same time the other rotatable member 112 of the beraring is in contact with the lower race 119, and therefore rotating in an opposite direction. And, as can be further seen, the races 118 and 119 can be formed of any form of polymer, or elastomeric material, among other type of materials, and be reinforced by the insertion of a plate and structurally held by means of pins, as can be seen at 120, to insure their stability and lasting wear during prolonged usage.

Before a description is made of the specific use of the bearing or its modification as previously analyzed, or its support, in the field of gymnastics or rehabilitation work, perhaps a description of this specific use of the bearing itself in instrumentalities may be helpful as a means for exhibiting its versatility of usage. For example, one use for the bearing of this invention is shown in FIGS. 37 through 41, wherein a plurality of such bearings, as at 121 in FIG. 37, being of a design and functionability similar to that previously explained with respect to the bearings 14 and 110, is disclosed. The bearings 121 in this particular instance are held within a perimeter frame 122, of the type that may be used for conveying purposes, as in the configuration of a dolly. Each bearing 121 includes a pair of rotatable members 123 and 124, which are journaled for rotation, or their counter rotation, upon their respective shafts 125. Each of these shafts are rotably secured to their respective portions of the perimeter frame 122, and are secured at their innermost ends by means of the intermediate frame 126. Each of the rotatable members 123 and 124 are bearing mounted, by means of the bearings 127, to the shafts 125, and it can be seen that as the dolly moves along a particular surface, its outermost rollers 123 will rotate in one direction, while any material, during its shifting upon its upper surface, will be in contact with the rotatable members 124, and may turn in either the same or counter rotation with respect to the movement of the roller 123. Thus, the dolly is a convenient instrument for facilitating the movement of any heavy and bulky item or material held upon it when transferred over a surface or ground, and at the same time, due to the location of its innermost rotatable members 124, once the conveyed item reaches its destination, it can be easily rolled off of the same, by function of these said inner rollers 124. In addition, and as can be seen in FIG. 39, the dolly has a rather streamline appearance, of a very low profile, not requiring any heighth greater than slightly greater than the diameter of one of its rotatable members. Detention means 128 is useful for holding any material or item upon the dolly during transit, as through its upper gripping edge 129, which can be released and lowered when desired to allow the material to be rolled off of the said dolly.

FIG. 41 discloses the use of a pair of bearings, as at 130, designed in accordance with the teachings of this invention, and for use in a conveyor, extension boom, fire ladder extensions, bucket cranes, in supporting a travelling table, for use as ship dry dock rollers, or in many other similar applications. As can be seen, a lower track 131 furnishes support for the outer rotatable member 132 of each bearing, while an upper track 133 is designed for intermittent contact with and close tolerance retention of the inner rotatable members 134. Thus, the outer perimeter frame 135 may contain connectors that are useful for mounting of any equipment that may be transferred along the bed as its bearings shift along its length. And, as can be seen, the rotatable members of each bearing are provided with a designed integral marginal lip, at 136, and which are designed for close tolerance location either just externally of the track 131, or internally of the track 133, so as to insure retention of the bearings within the conveyor system, particularly when the conveyor may undertake the design of curves or inclines, or other irregular shapes, as may be desirable to achieve of item transfer to various locations of a plant, or the like. This cannot be done with the prior art type devices.

Figure 32:
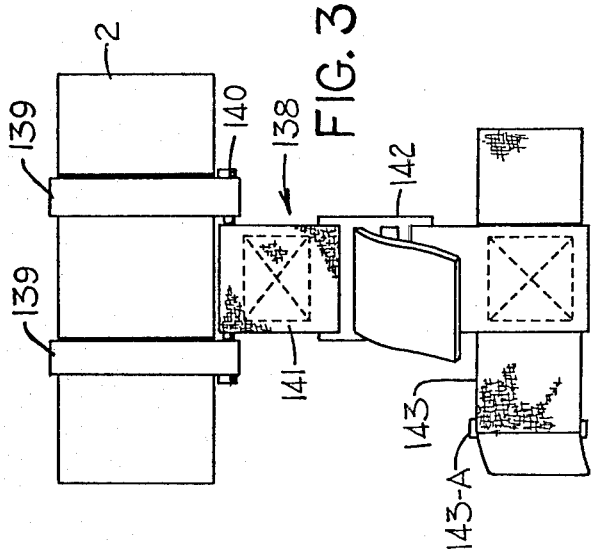
FIG. 32 provides a side view of the leg strap assembly as shown in FIG. 31.
Figure 33:
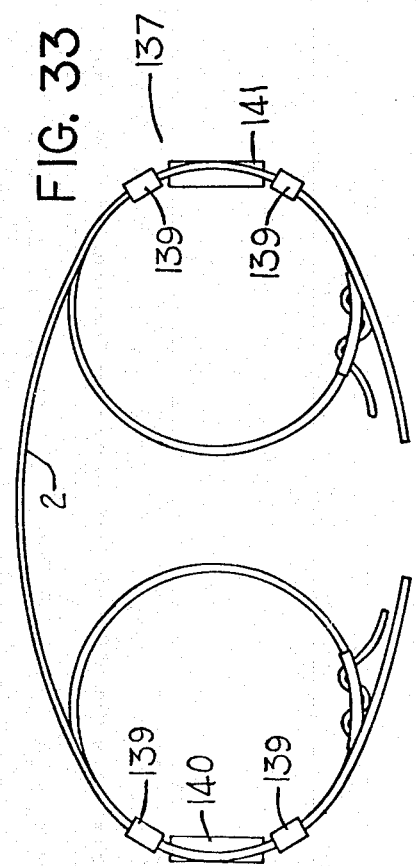
FIG. 33 discloses a plan view of the leg strap assembly as shown in FIG. 31.
Figure 31:
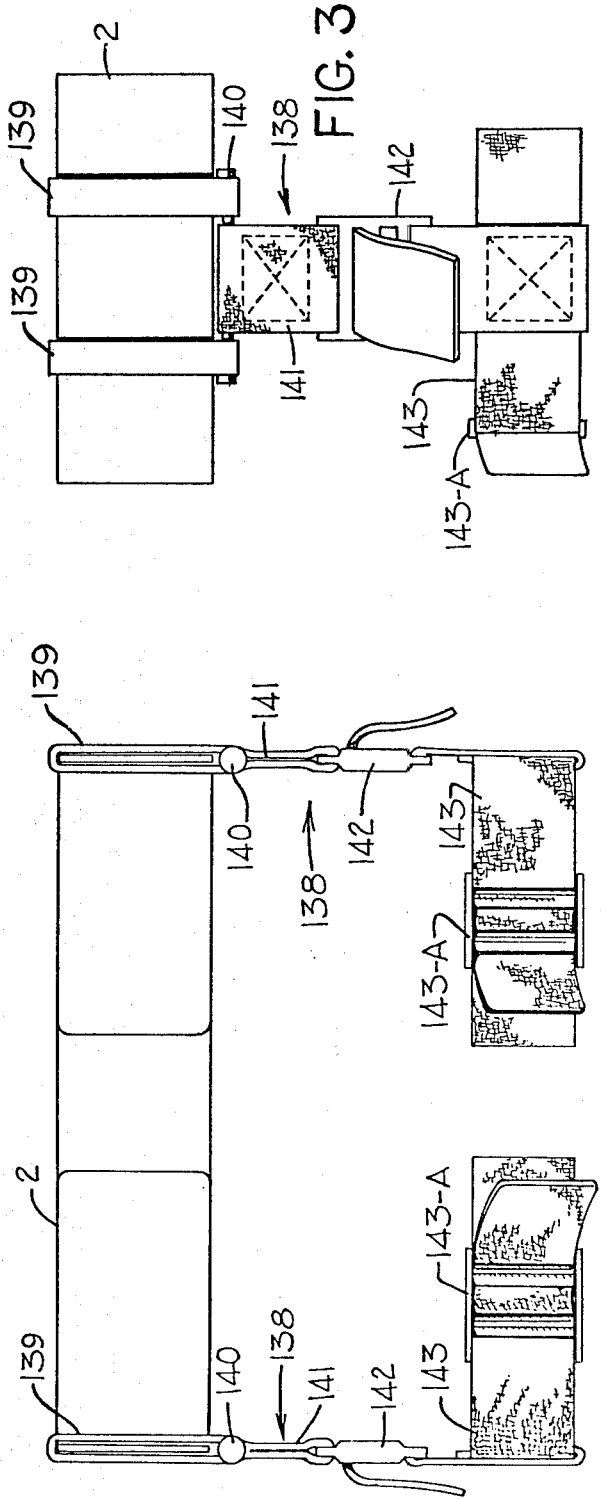
FIG. 31 shows a front view of a leg strap assembly securing with the structural member of the support.

Reverting more specifically to the usage of this bearing in the support as previously explained, and more particularly with respect to the field of gymnastics, it is helpful that some means be provided for retaining the support at the vicinity of the hips of its user. This had been previously explained within this application, and such is desirable because the gymnast frequently performs exercises that require a full pivot of the upper torso about the hips with respect to the legs. This can be readily visualized when one comprehends the style of body movements undetaken during a standing in place somersault. Thus, if some means is not provided to retain the support at this particular location, it has a tendency to ride up upon the hips and enter into the vicinity of the gymnasts waist. Thus, FIGS. 31 through 33 disclose a form of leg embracing means that can be used for retention of the support at this particular location. This means 137 includes a pair of vertically arranged straps, as at 138, provided to either side of the structural member 2 of the support, with these straps including upper portions, as at 139, which may hook or secure around the structural member 2, and having a pivot pin 140 disposed at their lower ends, and to which the lower straps 141 may secure. These lower straps may include an adjustment buckle 142 for providing an adjustment in the length of the straps with respect to the structural member 2, and connecting at the lower ends of each strap 138 is a leg embracing strap 143. Adjustment buckles 143a are also provided in these leg embracing straps 143 so that they can be opened, when accommodating a leg, and then fastened tightly, but not constrictingly, about the same.

A slight variation on the style of leg embracing means is disclosed in FIGS. 34 through 36. As can be seen, the structural member 2 includes a strap 144 disposed to either side of the said structural member, and which strap may be constructed of either heavy fabric, or even of strap steel. In any event, the lower end of the strap 144 includes a ring like member 145, while the upper ends of the straps are secured by the fastening means 146. Linked with each ring 145 is a leg embracing strap 147, conveniently cushioned as can be seen, and which includes an adjustment buckle 148 providing for snug engagement of the strap about the leg of the wearer. And, as can be seen, these two straps 147 are rather angulated with respect to each other, in the position of a vee configuration, and therefore provide the most comfortable but yet structural support to the wearer during usage, particularly when undertaking rather extensive physical maneuvers.

Figure 42:
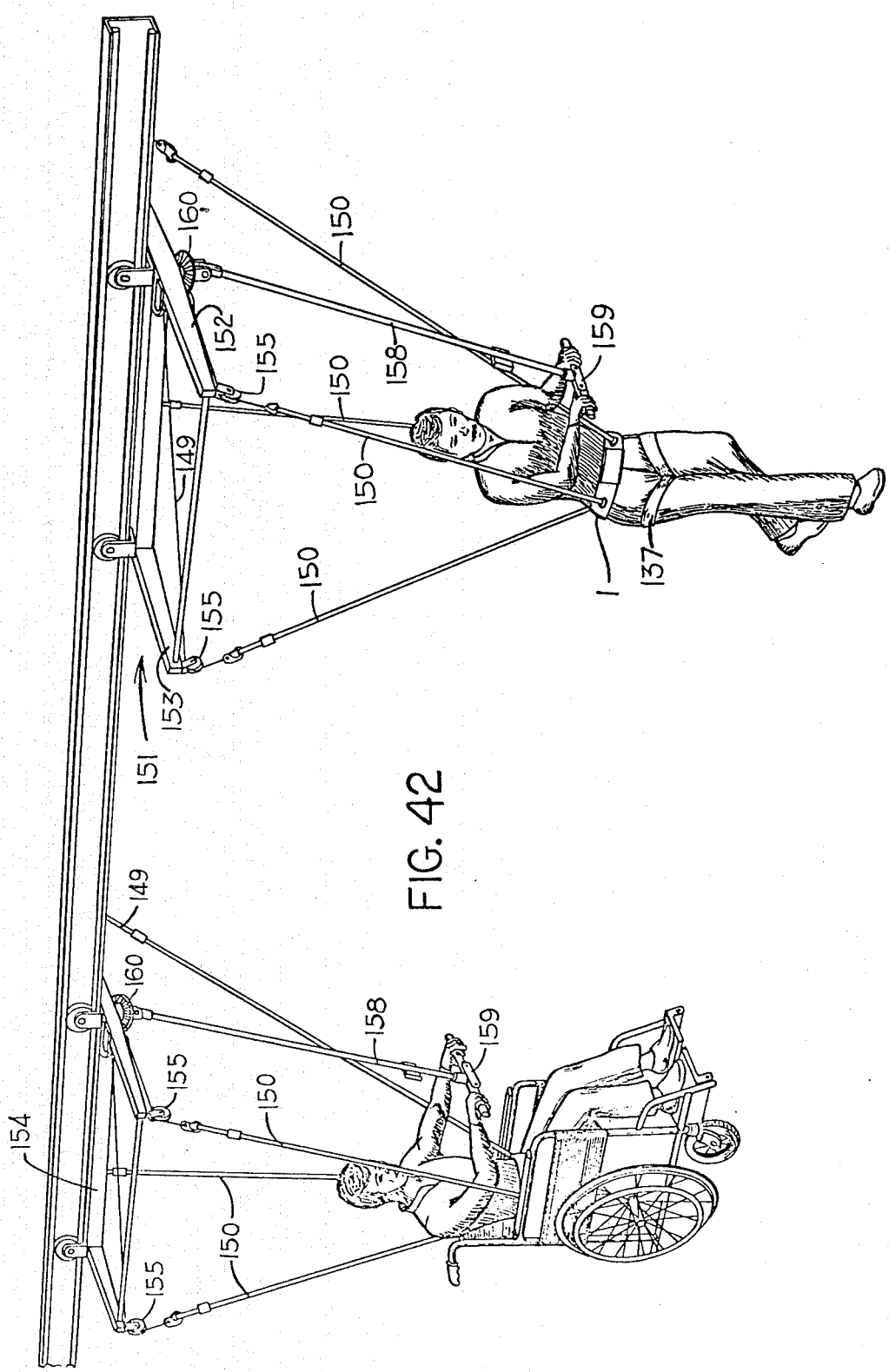
FIG. 42 reveals the support as suspended from a crossarm and track assembly for aiding invalid maneuvering.

Various applications can be made of the support 1 of this invention, and as shown in FIG. 42, it can be adapted for use by the invalid so as to assist the party either during therapy, rehabilitation, or to cope with everyday existance. As shown, the support 1 has a series of cables 149 connected to its swivels at four spaced locations about its periphery, with the lower ends 150 of each cable being rigid, so as to provide an area where the invalid can grasp when desired. Actually, these ends 150 of the cables may comprise rods that affix to the support, at their lower ends, and which are hooked onto the ends of the cables 149, as can be seen in the upper portion of said drawing.

In either event, the support, and its suspension cables 149, can allow the invalid to either seat himself within a wheel chair, as shown, or to stand erect and undertake walking movements, as can be seen. As can also be seen, a leg embracing means 137, such as like the one previously explained, may be used in conjunction with the support 1 to further enhance the stability of the invalid.

Figure 44:
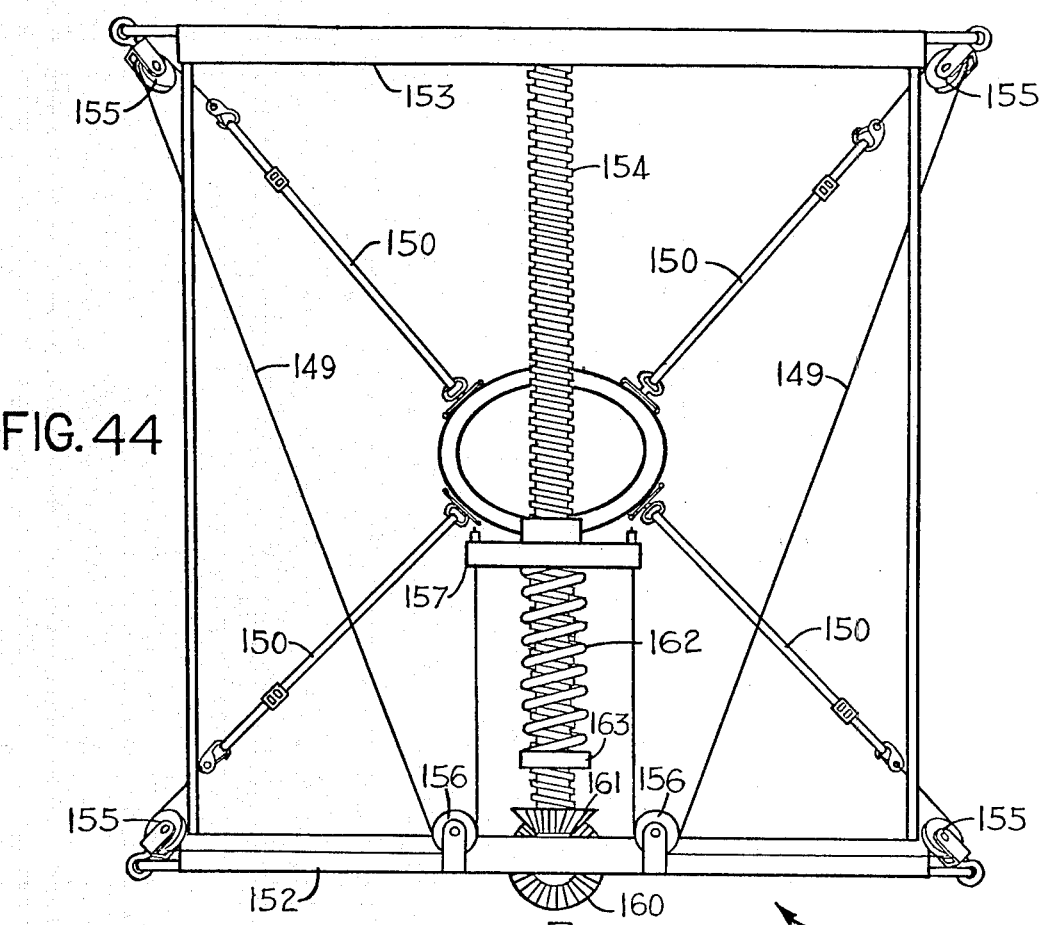
FIG. 44 provides a plan view of the invention as shown in FIG. 43.
Figure 43:
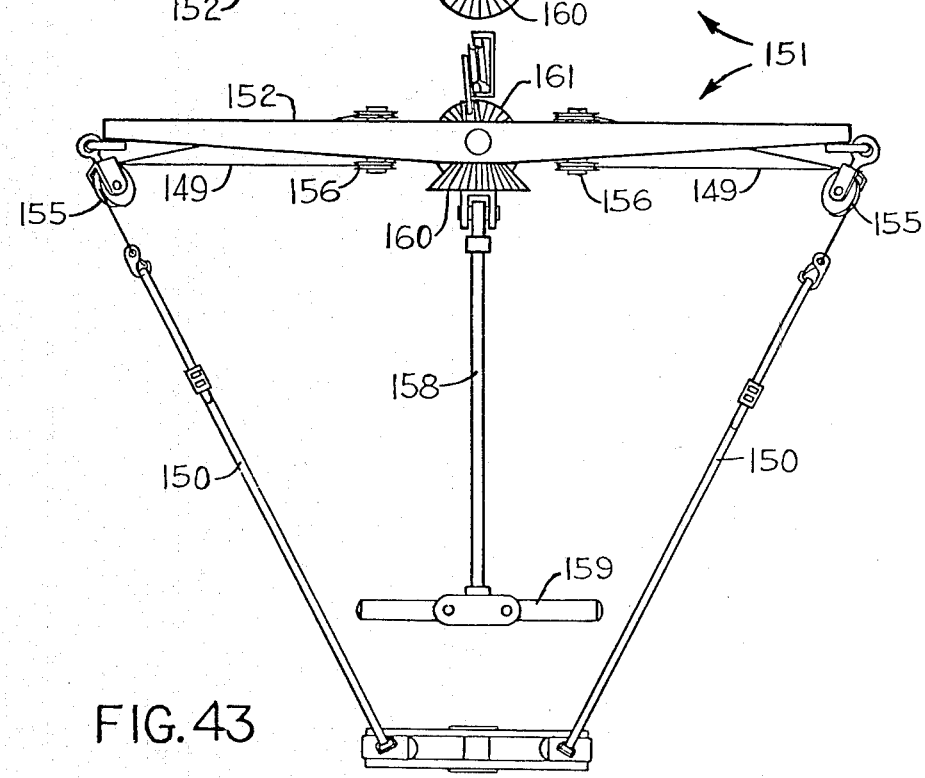
FIG. 43 provides a front view of the invention as shown in FIG. 42.

The upper framework, as at 151, and as also shown in FIGS. 43 and 44, is designed to provide further convenience in the use of the support of this invention, particularly when employed by the invalid. As can be seen, this framework includes a pair of crossarms 152 and 153, and which are spaced apart by means of a beam 154. Provided at each end of the crossarm is a sheave, all of them being identified at 155, and around which the cables 149 are disposed. Each of the cables extend towards the inner portion of the front crossarm 152, where they are turned once again about a pair of sheaves 156, with the cables then extending rearwardly for connection with a shiftable member 157. This shiftable member 157 is threadedly engaged upon the beam 154, which also may incorporate threads, as shown, so that as this threaded beam is rotated, the shiftable member 157 will progress either forwardly or rearwardly with respect to said beam. Obviously, as such shifting occurs, the cables 149 may be either raised or lowered, causing a similar and simultaneous type of movement of the suspended support 1. Thus, when the cables 149 are lowered, the support likewise will be lowered, thus allowing the invalid to either seat himself within his wheelchair, as shown, or perhaps even become disposed in a bed or other item. But, when the shiftable member 157 is moved rearwardly of the overhead framework 151, then the cables 149 are raised upwardly, causing a similar movement of the support 1, and thus allowing the invalid to move into an erect and standing position, thereby facilitating his movement, and assisting his walk.

The shiftable member 157 of the overhead framework 151 of the invention, as just previously explained, may be either manually moved, or even automatically shifted by means of the operation of the motor or other power driving member. Under manual function, the control bar 158 extends downwardly and has a handle bar 159 securing at its lower end. Its upper end may incorporate a bevel gear 160, which intermeshes with a similar type bevel gear 161, the latter gear being rigidly secured with the threaded beam 154. Thus, as the handle bar 159 is turned, its bevel gear 160 causes a turn in its mating gear 161, thereby effecting a rotation of the threaded beam 154, thus causing the said shiftable member 157 to move in one direction or another with respect thereto. And, although it is not shown, it would be just as easy to incorporate a form of motor means proximate the forward end of the threaded beam 154, and controlled by a remote control device in the proximity of the handle bar 159, which may control the energization of said motor, to thereby drive the threaded beam 154 into rotation, and thereby effect a similar shifting of the member 157 longitudinally of said beam. Obviously, any such motor would preferably comprise a reversible motor so that the cables 149 may be raised or lowered at any given movement as desired.

It can be seen that the shiftable member 157, as shown in FIG. 44 has a spring means 162 provided thereon, and incorporates a forwardly disposed block 163 so as to cushion the impact of the shiftable member as it approaches its forwardmost disposition upon the beam 154. Thus, no impacting type of forces will be encountered by the invalid when utilizing the support and suspension framework of this invention. And, the block may be adjusted into position so that as it approaches its forwardmost position, the invalid will be able to just undertake a comfortable sitting or lying down position.

The more specific application of the support 1 in the field of gymnastics is shown in FIG. 45, where it is used in conjunction with a horizontal bar. As can be seen, the gymnast has the support 1 embraced about his waist, and cables 164 and 165 are angularly directed laterally from the support and extend to the bearings 166 held proximate the ends of the said horizontal bar 167. Spring means (not shown) may be disposed intermediate the ends of said cables and releasible latches 168, as shown, so as to provide some variations in the force induced length of the cables during a performance by the gymnast. These releasable latches 168 are designed for the purpose as previously explained, and that is to allow for a disengagement of the cables from either the gymnast, or perhaps even the bar 167, when the former performs a fly away from the bar at the termination of a routine. These releasable latches may preferably be remotely controlled so that at the properly timed moment they may be signaled for release to achieve their disengagement and release of the cables 164 and 165 from the sides of the support 1, as desired. See also FIGS. 46 and 47.

Each specific releasable latch 168 includes a ring 169 which is attached with one of the cable ends 164 or 165, with the ring then cooperating with a slidable detent member 170 that is designed for partially inserting through a slot, as at 171, and arranged for longitudinally sliding along the length of one of the links 172, that may hold two of the bearings 173 and 174 of the support 1 together. The detent member includes a latch means 175 that is normally spring biased by means of the spring means 176 for engagement against the boss means 177 of the link 172. But, when the, preferably, remotely controlled solenoid 178, or other form of electromagnetic or other releasing device, extends its stem 179, it urges the detent 170 forwardly against the means 177, thereby effecting its retention of the ring 169 as previously described. But, when the solenoid is remotely actuated, it retracts its stem 179, thereby effecting a disengagement of the latch 175 from the ring 169. Hence, under that condition, the detent means 170 is free to slide away from the boss 177, and thereby free the cables from their connection with the support 1, leaving the performer unencumbered for his contemplated fly away. It is possible that a manual form of release could be substituted for the latch 168.

The support of this invention has further application within the field of gymnastics in that its use can be made by the tumbler when undertaking a variety of movements. See FIG. 48. This particular installation can be erected also for outdoor usage, since it has full support from its integral and composite structure. The support 1 is suspended by the cables from the crossarm 180, and which crossarm may be roller mounted from a suspended overhead track 181, as shown. A plurality of A-frame supports, as at 182, horizontally and angularly dispose the structures 183, which in turn suspends the track 181 as previously described. Thus, a good physical display of the variety and series of movements that can be made by a gymnast while performing tumbling exercises can be seen from this figure, wherein at its left side location the gymnast commences to run into a forward motion drawing the crossarm 180 along the track 181 therewith, and then undertakes a combined somersault and simultaneous twisting motion ending up once again erect as shown at the right hand side of this figure. Thus, a greater variety of forces are exerted at the location of the bearinged support about the hips of the gymnast, but yet, due to the unique design of the bearings incorporated within the support, and its suspension by means of the variety of cables, presents no friction against the free movement of the gymnast as shown.

While the just previously explained crossarm 180 for use during tumbling is shown mounted upon an A-frame supported track, it is just as likely that for the convenience of space limitations, such as inside a building or gymnasium, the crossarm may be supported upon a track at a more compact location as the space limitations may require due to a building size. For example, and as shown in FIGS. 49 and 50, the crossarm 180 may be suspended by a framework 182 in cantilever fashion from the wall, as at 183, of the gym. And, to show an adaptability of this invention in its installation, it could even be located at a position of storage above the usual collapsible or opened gym seats provided in an auditorium, the former being shown, so that when the seats are extended for use, the crossarm and framework may be withdrawn upwardly into a nonoperative and storage position, as shown in FIG. 50, or when the gym seats are collapsed for non use, the crossarm 180 may be lowered downwardly through the unwinding of a winch, and its cable 184, until its framework 182 undertakes its cantilevered horizontal disposition, as shown in FIG. 49. And, in that position, the crossarm is readied for usage by the tumbler, as previously explained with respect to the one shown in FIG. 48, or by any other gymnast performing related type feats upon various gymnastic equipment. The crossarm is even pivotal in its mounting, so that when in operation, it undertakes the disposition as shown in FIG. 49, but that when raised upwardly into its nonoperative disposition, as shown in FIG. 50, the crossarm 180 may be pivoted approximately 90°, so as to readily fit within the temporary storage position as shown. As can be seen in FIG. 51, the crossarm frames 185 are suspended upon a pin 186, and when the frames 185 are raised upwardly, their integral sleeve 187 can be disengaged from the pin 188 to allow for the turn of the said crossarm 180 into the position of storage as shown in FIG. 50. On the other hand, when the pin 188 seats within the lower slot provided within the sleeve 187, the crossarm may then be arranged into its operative configuration, and remains thusly because of the pin location, during the time while the gymnast undertakes her maneuvers. The upper annulus 189 of the pin 186 is pivotally mounted within the upper crossarm framework 190, and which framework supports the bearings that roller mount upon the track 191, as can be seen.

Figure 52:
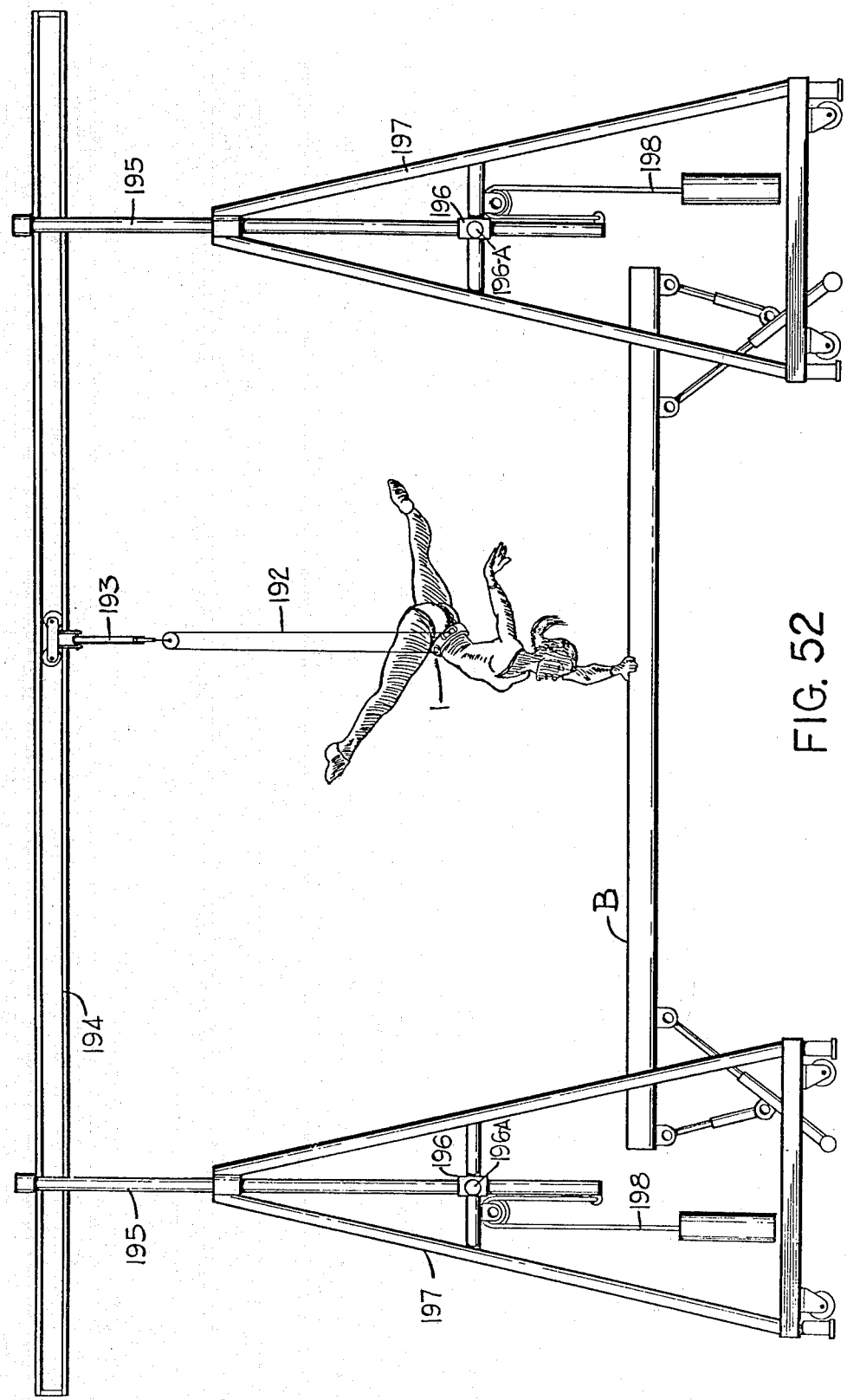
FIG. 52 provides an isometric view of the heighth varying track and crossarm combination as used for suspending the support and a gymnast while functioning upon a balance beam.

A further application of the support 1 of this invention is shown in FIG. 52, where it is applied in conjunction with movements undertaken upon the balance beam B. As can be seen, support 1 is located around the hips of the gymnast, and the cables 192 are directed angularly upwardly therefrom, and spaced apart by means of the crossarm 193. The crossarm is roller mounted to the overhead track 194, which is suspended at its ends by means of the uprights or columns 195. The overhead track 194 is aligned parallel and vertically above the balance beam, as shown, and is adjustable with respect to its heighth by being shiftable upon its columns 195. This can be attained due to the fact that the columns 195 are slidably held within the collars 196 connected to the frame members 197, and counter weighted cables 198, connecting to the lower ends of the columns 195, are useful for raising or lowering the columns, when the column fasteners 196a are loosened, for thereby providing a raising or lowering of the accompanying track 194 with respect to the balance beam. Therefore, depending upon the size and heighth of the gymnast, the support 1 may be precisely located at that location approximating the hip heighth of the performer, so that the safety feature added by the use of the support can be accurately attained prior to a gymnast performance upon this item of equipment. In addition, the style of releasable latches 186, as previously explained in FIGS. 46 and 47, may interconnect between the cables 192 and the support 1, and provide for cable disconnection in the manner as earlier cited when the performer completes a routine upon the beam. It may also be commented that these releasable latches 168 may also be used in conjunction with the support as employed by the gymnast during performance upon any of the variety of equipment explained herein.

An example of the type of crossarm that may be used as a means for suspending the bearing of this invention is shown in FIG. 53. This crossarm 199 comprises a tubular member 200 which may extend laterally of the suspended overhead track 201, with the said crossarm being bent angularly downwardly a slight degree so as to dispose its rotatably mounted sheaves, as at 202, at a location for angulating the cables to that degree desired to attain the type of clearance necessary for the limbs of the performing gymnast, or others. Spring means 203 may be added to the cable suspension system so as to cushion the movements of the support, as when applied to the waist of its user, and the spring means, as shown, are disposed within the tubular member 200, and have the cables 204 extending therethrough and secured by means of the blocks of 205 at the innermost ends of the said spring means. Additional securing means 206 attach at their upper ends 207 to the tubular member 200, while their other ends extend through the spring means for attaching by means of the blocks 208 for suspending the spring means at this location within the crossarm. Obviously, when a pull is made upon the support, and the cables 204 are drawn downwardly, the spring means 203 will be compressed, thereby providing a slight lengthening and cushioning of the cables 204 externally of the crossarm. Major adjustments may be made to the cable lengths by shifting the spring means 203 further upwardly within the tubular member 200, and this can be attained by hooking the upper ends 207 of each of the securing means 206 upon one of the other eyelets 209 disposed along the upper surface of the said tubular member. Guy rods 210 may be arranged above the tubular member 200 and act as tension rods for reducing the bending stresses in the crossarm, thus allowing it to weigh less and reduce its inertia of movement and drag on the gymnast, and such guy rods may further reinforce the crossarm at their shown locations. Approximately at the center of the crossarm are a pair of standards 211, each having a roller 212 rotatably mounted therewith, and which rollers are designed for riding upon the lower flange of the web connected channels of the suspended track 201. Thus, the entire crossarm is roller mounted to the track 201 and can conveniently shift therealong under the influence of the movements of the gymnast when exercising.

As can be seen in FIG. 54, there are a pair of rollers 212 provided to each side of the track, so as to insure that three rollers will stably remain in place upon the track and not disengage from the same.

A variation in the style of crossarm for use with the support of this invention is shown in FIG. 55. As can be seen, the crossarm 213 includes a tubular member 214 that spans just short of the distance between suspended tracks 215, and having pivotally mounted proximate each of its ends a bearing 216, each of these bearings being designed in a fashion similar to the bearings 14 or 110 previously analyzed in this application. As can be seen, each track 215 has an upper and lower race or rail 217 secured thereto, and the rotatable members of each bearing are designed for riding respectively upon one of these races.

The tubular member 214 of this crossarm is of lineal design, and is formed having a pair of sheaves 218 rotatably mounted proximate both of its ends, and the cables 219 that suspend a support extend upwardly and around these sheaves for disposition internally within the crossarm. Spring means 220 are provided within the tubular member, and one end of each cable 219 extends through the spring means and is held by a block, as at 221, to the innermost end of the spring. Securing means such as the cables 222 also extend through the spring means and are held by the blocks 223 at the outermost ends of the springs, with the cables 222 disposed around the sheave 224, with their outer ends being fastened, as by the hooks 225, to one of the series of eyelets 226 provided on the exterior surface of the tubular member 214. Thus, cushioning is provided for the cables 219 by their arranged attachment to the spring means 220, so as to dampen any forces exerted upon the cable suspended support by its user. Obviously, a more simplified means for spring mounting of the cables could be accomplished through the use of a single spring, and having it attach at approximately its midpoint to the interior center portion of the tubular means 214. But, the design as shown, by having the securing means 222 as displayed, provides for a major adjustment in the length of the various cables through the combined operations of the fasteners 225 about the aligned eyelets 226.

Figure 48:
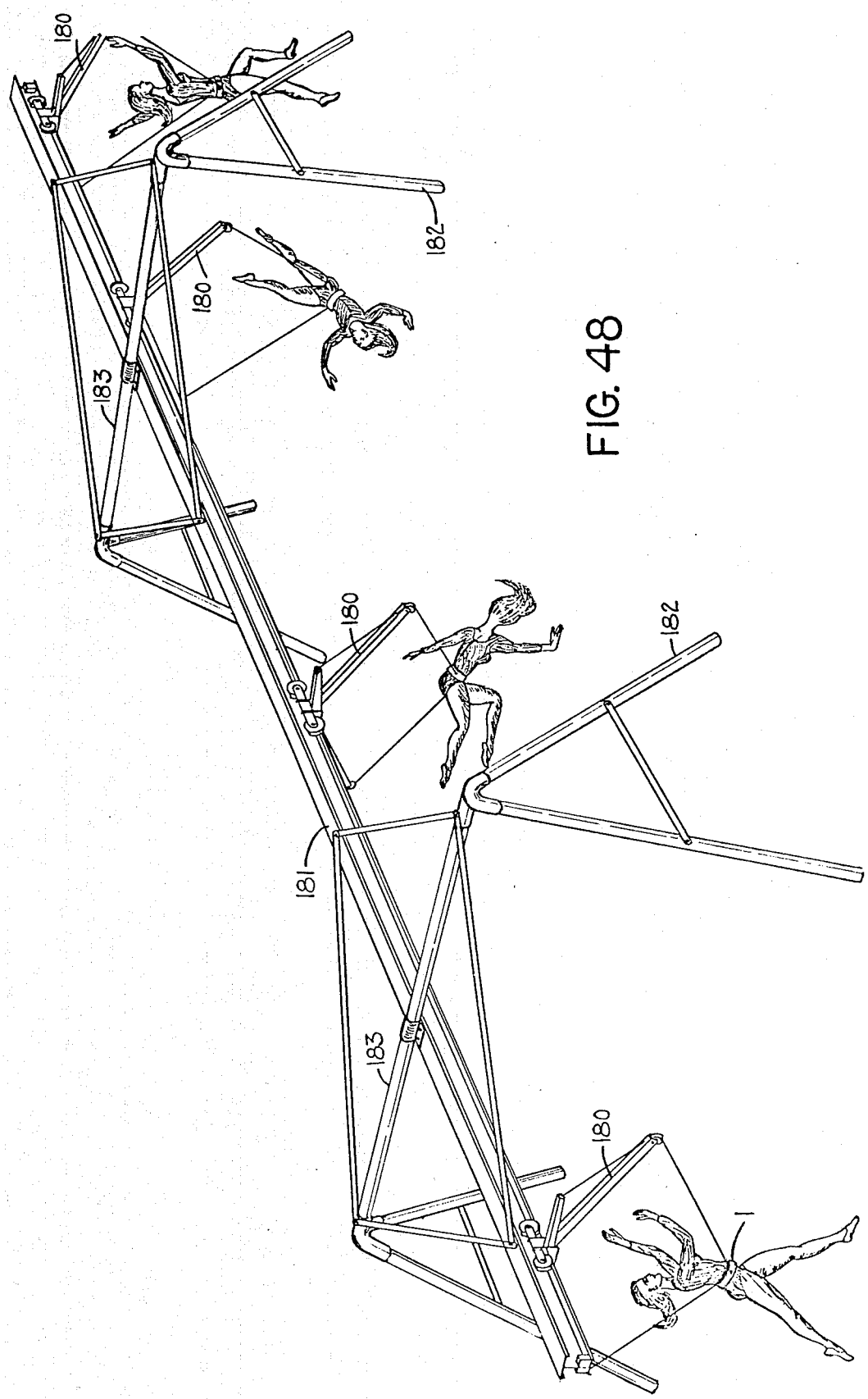
FIG. 48 provides an isometric view of the track and crossarm combination as used for the cable suspension of the support and a gymnast while tumbling.
Figure 58:
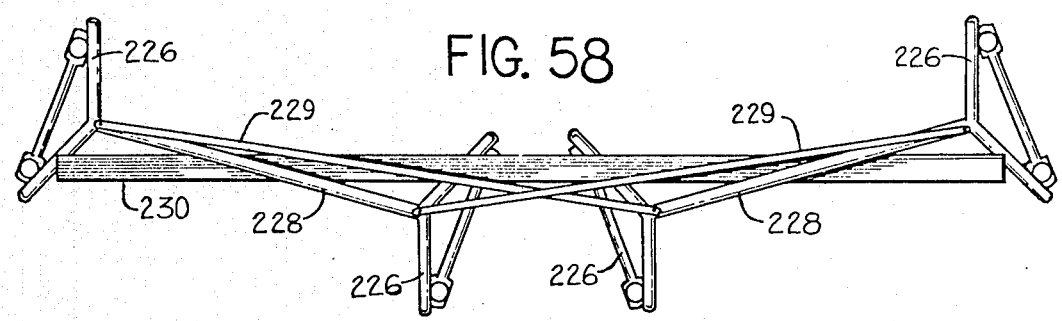
FIG. 58 discloses the portability of the frame member as shown in FIG. 56, disclosing how it folds to facilitate its storage as when not in use.
Figure 57:
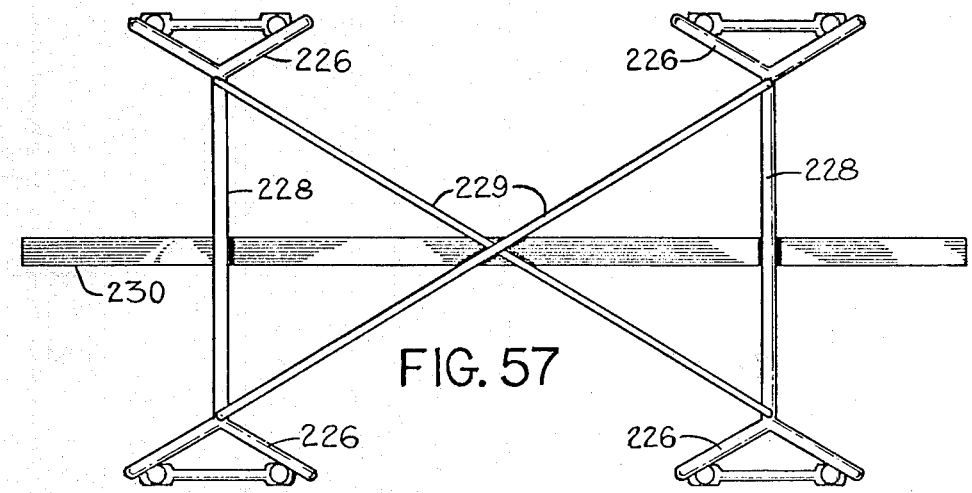
FIG. 57 provides a plan view of the frame member as shown in FIG. 56.
Figure 56:
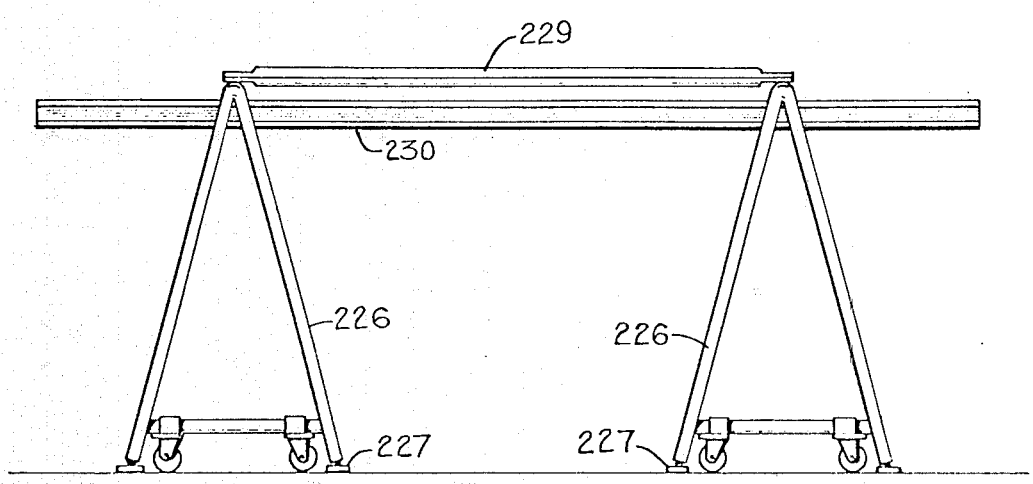
FIG. 56 discloses a modified form of roller mounted frame member for use in suspending a track above, as for example, the balance beam.

Various of the style of frame members utilized for supporting the track and support of this invention are shown in FIGS. 56 through 58. And, as can be seen, the frame members are designed to incorporate foldability, as shown specifically in FIG. 58, so that when not in use, it can be reduced in size and moved to a position for temporary storage. Portability is also provided through the frequent application of casters, as shown. And, the frame member of this design may be utilized in conjunction with any of their variety of gymnastic equipment incorporating an overhead track, such as the one previously explained as for use in conjunction with tumbling, as shown in FIG. 48, or, as by way of a further example, for use with the balance beam, as shown in FIG. 52. In any event, the designed frame member includes a series of pairs of laterally disposed A-frames 226 which may be either roller mounted, for ease of maneuverability, and further incorporate leg extensions, as at 227, which can be depressed downwardly by a foot maneuver so as to affix the frame member firmly in place above one of the previously mentioned items of gymnastic equipment, thereby lifting it free of its casters off the floor. Each pair of the A-frame members 226 are spaced apart by means of a cross bar 228, with diagonal bracing 229 further reinforcing the structure. The track 230, and of the type that may be used for supporting a crossarm, such as the previously explained crossarm 199, is rigidly suspended beneath the cross bars 228 of the frame member. And, as can be further seen in FIG. 58, each pair of A-frame supports 226 and their respective cross bar 228 can be pivoted in position so as to undertake collapse, and reduction in size, as shown.

Figure 59:
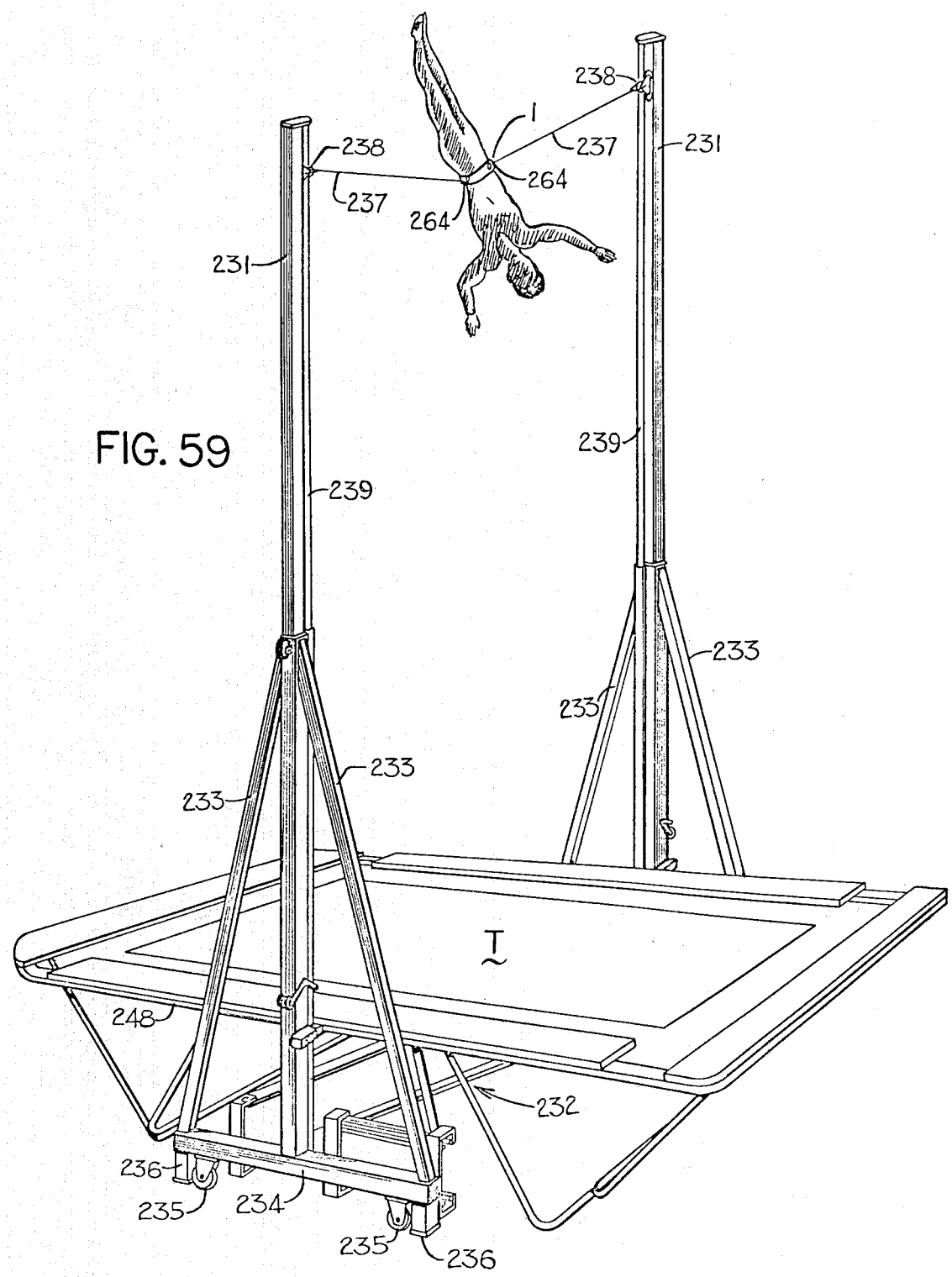
FIG. 59 provides a perspective view of the cable suspended support and frame of this invention as utilized by a gymnast while functioning upon a trampoline.

Another use for the support 1 of this invention is shown in FIG. 59, wherein it is designed for suspending the gymnast while performing upon a trampoline. It was previously explained that many injuries occur to the user of the trampoline, and therefore, a means for suspending the gymnast at approximately the midpoint of the trampoline and allow him/her to undertake all of the usual maneuvers thereon, is a desirable addition to gymnastic equipment, particularly of the type as used in combination with the trampoline.

The equipment includes a pair of uprights or columns 231 arranged to either side of the trampoline, and having sufficient heighth so as to provide clearance for the performer when he reaches the rather excessive heighths that can be attained by the gymnast when jumping upon the trampoline, as can be witnessed. A foldable brace 232 may be disposed below the trampoline and intermediate the lower ends of the columns 231, so as to stabilize the structure, and allow for its folding when not in use.

The columns 231 are each stabilized by a pair of brace means 233, and which brace means are secured at their downward ends with a cross support 234, and which cross support has connected to it the foldable braces 232 as previously explained.

The cross support 234 has the casters 235 connected upon it, and when said casters are arranged upon the floor, allow for the ease of maneuverability of this equipment. And, leg extensions 236 may be provided adjacent to each caster, and when the casters are raised, as when actuated by the foot, and in a manner as available in the art, can provide for a raising of the casters 235 off of the floor, and the positioning of the legs 236 thereon and a stable dispositioning of this entire item of equipment firmly in place, adjacent to either side of the trampoline T.

Extending laterally from the suppot 1, as embracing the gymnast, are a pair of cables 237, and which cables are connected to rollers, as at 238, which are arranged for rolling vertically either upon the columns 231, or more preferably upon the slightly inwardly but parallel disposed vertical bars 239 of the structure. These rollers 238 are designed for freely and near frictionless movement upon the bars 239 so as to give ample heighth to the gymnast while functioning.

As can be seen in FIGS. 60 and 61, the columns 231, and their parallel vertical bars 239, are arranged for telescopically mounting within corresponding lower structures 240 and 241, respectively, as shown. And, as can be further seen in FIG. 66, the rollers 238 are arranged for rolling upon their telescopic bars 239 and 241. In addition, cable means 242 is disposed for riding upon a sheave 243, and connects approximate the lower end 244 of the column 231 so that a drawing of the cable, or release of the same, will allow for the shifting of the said column 231 within the lower column structure 240, forming the lower upright portion of this equipment. A pair of detents 245 and 246 are connected respectively upon the column structure 240, and 231, so that when these two portions are extended to their full heighth, these two detents may frictionally engage and temporarily adhere the column fixed in place. In addition, any form of screw fastener, such as the hand manipulted screw 247, may be tightened so as to rigidly affix these two components together. The relative displacement of the various rollers 238 upon their vertical bar 239, and the sheave operated cable 242 operatively associated with the lower column structure 240 and the telescopically inserted upright 231 are more clearly shown in FIG. 67.

Further provided upon the lower column structure 240 of this invention are the gripping members 247, and as shown in FIGS. 62 and 63, these gripping members are designed for securing the side frames 248 of the trampoline. This is achieved by having a member 249 secured to the side of the previously defined upright structure 240, and which has connected to its lower side one end of a cable 250, and which cable is designed for being turned around the trampoline frame 248, and then secured by means of a fastener 251, which threadedly engages onto the opposite end of said cable, and then fastened to a bifurcated frame 252. As can be seen, upon a tightening of the fastener 251 upon the cable 250, the trampoline frame 248 becomes wedged between the notched shaft 253 and the tightening cable 250, to be thereby firmly secured in place, rigidly to this trampoline safety enhancing equipment. While most trampoline frames are of a similar heighth, a slight adjustment is provided by means of a series of fasteners 254 that fit through elongated slots 255 and fasten the upper and lower ears 256 of the member 249 to the column structure 240.

In referring to FIGS. 64 and 65, the foldable brace means 232 is further depicted. As shown, the brace means comprises a series of pivotally connected expandable links 257 which can be either extended or contracted with respect to each other by means of the turn screw 258 that threadedly engages with said links at their approximate midpoint, with the change in positioning of said links being effected by a turning of the turn screw handle 259. One end of the links 257 are pivotally connected stably to the base support 234, such as at 260, while the opposite ends of certain of the links, as at 261, are mounted by means of rollers 262 within the guides 263 that are associated with each of the base support 234, as previously identified. Thus, and as previously explained, a turn of the turn screw 258 provides for either a movement of the base supports 234, and all of their accompanying upright structures 231 and 240 either towards or away from each other depending upon the direction or rotation of said screw 258. When the links 257 are expanded laterally away from each other, as by a drawing of the turn screw in a manner that tightens the links together, then the base supports 234, and their uprights 231, and 240 will be laterally extended to their fullest position, and undetake a relationship just adjacent to the sides of the trampoline T, and more specifically its side frames 248, as can be seen in FIG. 59. On the other hand, when the turn screw is extended, thereby causing the upper and lower links 257 to draw the base supports 234 together, then the entire item of equipment will become contracted in the manner as shown in FIG. 65, with its uprights 231 contracted, for more compact storage. When in this position, the castors 235 can be extended for contact with the floor, thereby facilitating the maneuverability of this equipment.

Comment should also be made that in order to allow some freedom of lateral movement of the gymnast while operating upon the trampoline, that cable retracting means 264 may be provided to either side of the support 1, and thereby slightly draw in or extend cable as needed, under certain limitations, so as to allow the gymnast some slight lateral movement during his exercising. (See FIG. 59) Such type of cable retracting means normally include a spring mounted roller that is biased in the manner that always urges a drawing in of its coiled cable, but that when a slight amount of force is exerted upon said cable, it will withdraw the same from its support means. Such a device is commonly used in the standard safety belt normally employed in the automobile.

Figures 68, 69:
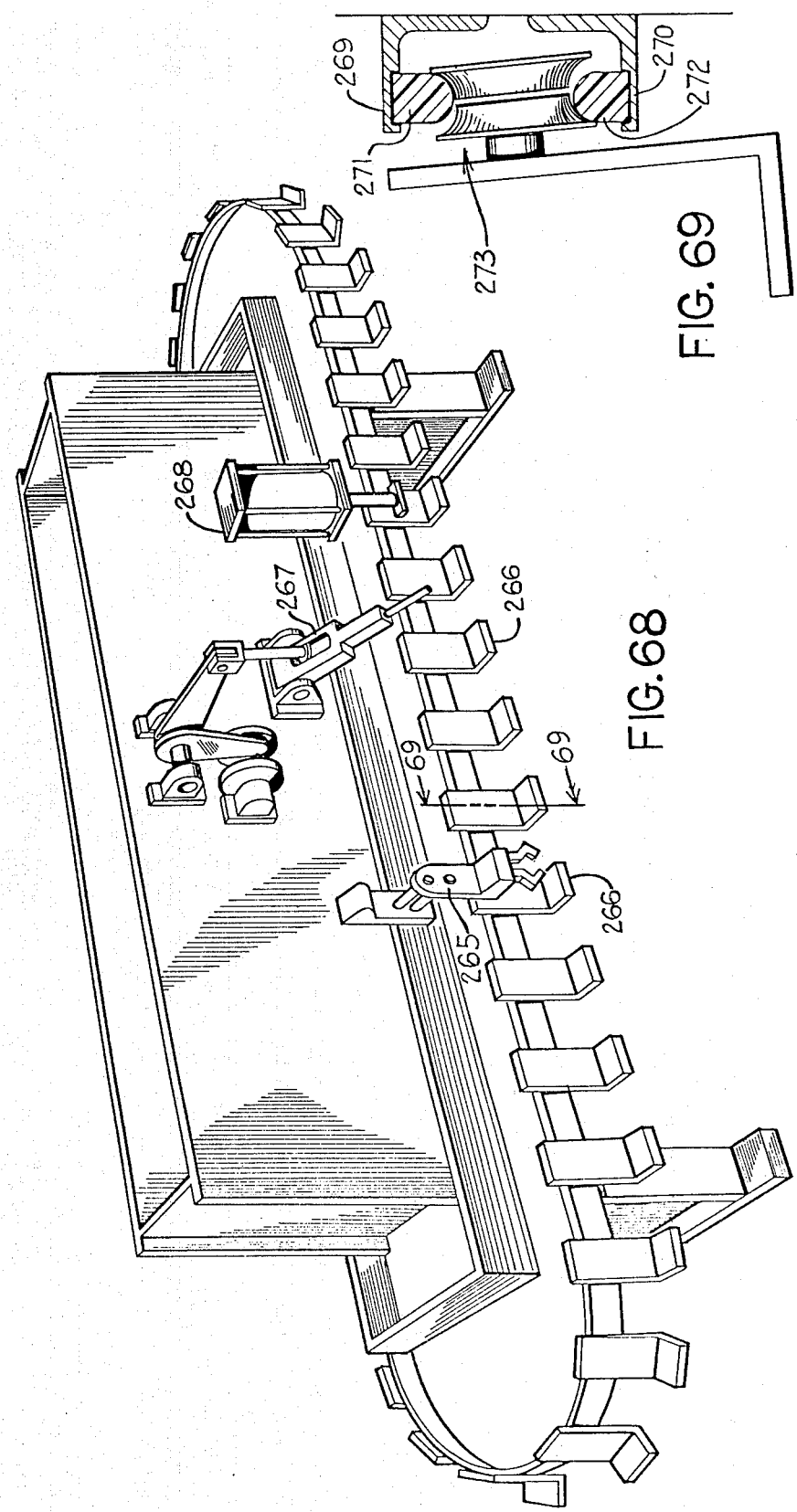
FIG. 68 discloses an isometric view of an inline transfer machine incorporating the bearing of this invention.
FIG. 69 discloses a sectional view of a component holder as movably mounted to the machine by means of the bearing of this invention taken along the line 69—69 of FIG. 68.

Yet another usage for the bearing of this invention is disclosed in FIGS. 68 and 69, and it may be used in conjunction with an inline transfer machine of the type as shown. A machine of this type usually includes means for performing some function upon intermittently conveyed items, and as can be seen, a pick and place instrument, as at 265, may insert items onto the component supports 266, and then various machining operations may be performed, such as a drilling function, by means of the instrument 267, or a punching operation as by means of the instrument 268. And, various other automatic machine tool operations may be performed upon such conveyed components, since this type of machinery may be located entirely around the circumference of the inline machine, as shown. The track arrangement for securing the component holders 266 may include a pair of channels 269 and 270 secured to the outer circumference of the machine, as shown, and each channel has secured to it a race or rail 271 and 272, respectively, and upon which the bearing 273 of this invention may ride. For the sake of illustration the bearing is shown as being rather loosely mounted upon the races, but actually, and in practice, a tolerance as close as one thousands of an inch can be attained between the two rotatable members of each bearing and its respectively supporting race.

Figure 70:
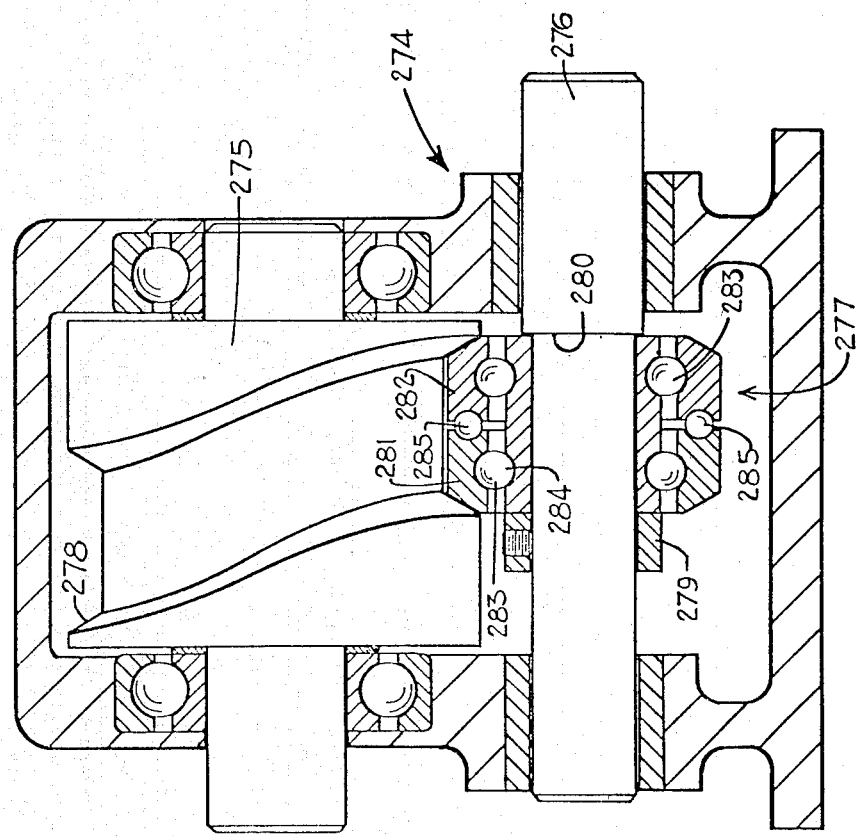
FIG. 70 provides a view of a roller gear indexing drive incorporating a cam and a follower, the latter being constructed from the bearing of this invention.

Various other similar uses as in the machine tool art, may be made for the bearing of this invention, and as shown in FIG. 70, a roller gear indexing drive 274, is designed for supporting a barrel cam 275, and is disposed for providing longitudinal shift of a shaft 276 by means of the disposition of a bearing follower 277 within a cam track 278. The follower 277 is fixed longitudinally with respect to the shaft 276, by means of the shoulders 279 and 280, but its rotatable members 281 and 282 are provided for rotating around the shaft under the influence of the cam track 278. As can be seen, each rotatable member is mounted by ball bearings 283 upon the collar 284 on the shaft 276, while other ball bearings 285 provide spacing intermediate the two rotatable members and sanction their near frictionless movement with respect to each other. While during routine operations of the roller gear drive as shown, they cause the rotatable members of the bearing to both rotate in the same direction, but in the event that the cam may incorporate any form of a cross over position where indexing, or multiple indexing, may occur, as where double tracks may be provided upon the cam, then it is likely that as the bearing encounters these cross over locations, or indexing locations, the rotatable members may individually undertake momentary reverse rotations with respect to each other, and therefore, the bearing of this invention provides for fascile movement of the follower with respect to its cam even during these rather critical, but yet closely tolerant, maneuvers of the cam and follower operation.

Figure 71:
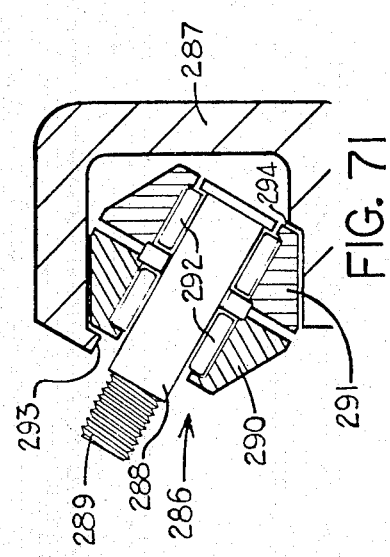
FIG. 71 discloses a side view of the bearing of this invention functioning as a follower in conjunction with the cam in forming a roller gear drive or conveyor.
Figure 72:
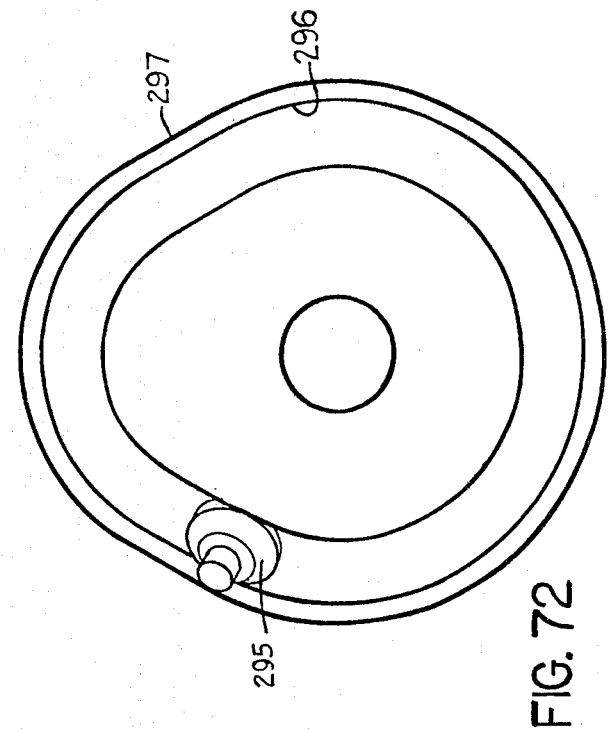
FIG. 72 discloses the bearing of this invention forming a follower for use in conjunction with, as for example, a face cam.

FIG. 71 discloses the use of the bearing 286, as of this invention, within a track 287, with the bearing having a shaft 288 extending outwardly thereof, and perhaps being threaded at its end, as at 289, for connection with or to some other item, such as, for example, a support like member 266, as previously explained with respect to FIGS. 68 and 69. Each rotatable member 290 and 291 of the bearing are secured for rotation by means of the roller bearings 292, and the bearing is positioned in place by means of the inclined edges 293 and 294 as formed upon the said track 287. Thus, a bearing that functions in a highly precise and close tolerance manner is shown in this particular figure, and while the bearing moves along the length of the track, its rotatable member 290 will be rotating in one direction, while its inner rotatable member 291 will be rotated in counter revolution to the first mentioned member. It can obviously be seen that a bearing track combination of this type can be made for very precise operation and at extremely close tolerances.

Finally, usage of the bearing 295 of this invention, being described similar to the bearing 286 just previously described, can be made also in the nature of a cam follower for riding within, for example, the cam groove 296 of a face cam 297. This is just an example of the versatility of the bearing of this invention when used as either a bearing, or a follower, in conjunction with a cam of varied design.

Variations in the bearing, support, and various other supportive structures and frameworks of this invention, as fully described in this application, may occur to those skilled in the art upon reviewing the subject matter of this extensive disclosure. Such variations or modifications, if within the spirit of the principle of this invention, are intended to be encompassed by any claims to patent protection attained herein. The description of the preferred embodiment is set forth for illustrative purposes only, and not meant to be limiting of the scope of the invention herein defined.

Having thus described the invention, what is claimed and desired to be secured by Letters Patent is:

1. A crossarm for use in conjunction with gymnastic equipment including a pair of supportive tracks, at least a pair of bearings, one of each bearing being operatively associated with one of said tracks, each bearing including a pair of counter rotatable members, said pair of members being rotatable about a common axis, a shaft having the pair of members rotatably mounted thereon and providing the common axis about which said members rotate, bearing means arranged intermediate the said rotatable members and the shaft to facilitate the turning of the said members therearound, a tubular member extending approximately the distance between each pair of bearings and being connected thereto, a sheave rotatably mounted proximate each end of the tubular member, a series of cables, and one of each cable operatively associated with the equipment and extending around the sheave for connection with the crossarm.

2. The invention of claim 1 and including at least one spring means arranged within the tubular member, said spring means having said series of cables operatively associated therewith and provided for adjustably varying the distance of the equipment from the crossarm during its usage.

3. The invention of claim 2 wherein there are two spring means provided within the tubular means of the crossarm, each spring means being fixed at one end to the crossarm, one of each cable extending around a sheave further extending into and through the tubular member and one of said spring means for fastening proximate its other end thereof, whereby upon use of the said equipment the exertion of a force upon a cable varies the distance of the said equipment from the crossarm.

4. The invention of claim 1 and including a pair of races connecting to each track, and one of each counter rotatable member of a bearing disposed for riding upon one of said race.

5. The invention of claim 4 wherein there are a pair of bearings riding upon the pair of races of each track.

6. A bearinged support for use for holding a gymnast and comprising a structural member provided for embracing said gymnast while functioning upon a balance beam, said structural member being resilient in content and having upper and lower edges, a series of keepers provided spacedly around the proximate upper and lower edges of said structural member, a pair of races, one of each race being held by the keepers associated with the upper and lower member edges, at least a pair of bearings operatively associated with the races of said support, each bearing comprising a pair of rotatable members, each pair of members being rotatable about a common axis and being capable of simultaneously turning in opposite directions, a shaft having the members rotatably mounted thereon and providing the common axis about which the said members turn, bearing means arranged intermediate the rotatable members and their shaft to facilitate the turning of said members therearound, said structural member being separable to allow its installation upon the gymnast, fastening means operatively associated with said member to secure its separate ends together as during usage, a cable operatively associated with each bearing and extending angularly away therefrom, a supported track suspended above and substantially aligned with the said balance beam, a crossarm roller mounted for movement along said track, the said cables being connected with the crossarm, whereby the gymnast attains maneuverability through a variety of motions while performing upon the balance beam with freedom from experiencing a fall.

7. The invention of claim 6 wherein said crossarm extends laterally to either side of the supported track.

8. The invention of claim 7 wherein said crossarm further extends angularly downwardly from the supported track.

9. The invention of claim 7 wherein said crossarm comprises a tubular member, a sheave rotatably mounted proximate each end of the tubular member, one of each said cables extending from the support arranged around a sheave and further extending within and partially through the said tubular member, the ends of said cables extending into the tubular member being fixed with respect to the said tubular member.

10. The invention of claim 9 and including a pair of spring means one of each spring means being disposed within each laterally extending portion of the crossarm tubular member, and the said cables extending within the said members being operatively connected with respect to the said spring means for providing variations under pressure in the length of said cables between the crossarm and its held support.

11. The invention of claim 10 wherein one of said cables extends through the spring means that secures to its inner end, a pair of securing means, one of each securing means connecting at one end to the crossarm in the proximity of the supported track, and extending at its other end also through the said spring means for attachment at its outer disposed end, whereby pressure exerted upon the said cables contracts the said spring means for adjustably varying the lengths of the said cables between the crossarm and its held support.

12. The invention of claim 6 wherein said supported track includes a pair of web connected channels, and at least a pair of rollers rotatably mounted to the crossarm, and at least one of each roller disposed for riding upon one of said track channels.

13. The invention of claim 6 and including a pair of columns provided at either end of the supported track, said track being adjustably held by said column, whereby the height of the supported track above the balance beam may be varied.

14. The invention of claim 13 wherein frame means support each track column as arranged at approximately each end of the said track, and said columns being adjustably held by said frame means to provide for adjustment in the established heighth of the supported track above the balance beam.

15. The invention of claim 6 and including frame means supporting the said track, said frame means being foldable to facilitate its storage as when not in use.

16. The invention of claim 6 and including a release means interconnecting between a bearing and each cable and when actuated disconnecting each cable from its attachment with the support.

17. The invention of claim 16 wherein said release means includes one of a solenoid and electromagnet.

18. A bearinged support for use for holding a gymnast for functioning upon the trampoline and supporting equipment and comprising a structural member provided for embracing the gymnast, said structural member being resilient in content and having upper and lower edges, a series of keepers provided spacedly around the proximate upper and lower edges of said structural member, a pair of races, one of each race being held by the keepers associated with the upper and lower member edges, at least a pair of bearings operatively associated with the races of said support, each bearing comprising a pair of rotatable members, each pair of members being rotatable about a common axis and capable of simultaneously turning in opposite directions, a shaft having the members rotatably mounted thereon and providing the common axis about which the said members turn, bearing means arranged intermediate the rotatable members and their shaft to facilitate the turning of said members therearound, said structural member being separable to allow its installation upon the gymnast, fastening means operatively associated with said member to secure its separate ends together as during usage, a cable operatively associated at one end with each bearing and extending angularly therefrom, a pair of uprights, one of each upright arranged laterally to either side of the trampoline, each cable at its other end arranged for vertically shifting with respect to its proximate upright, whereby the gymnast is allowed to maneuver through a variety of motions upon the trampoline with freedom from experiencing a fall from the same.

19. The invention of claim 18 and including a vertically arranged bar aligned with each upright and secured into parallel therewith, a roller assembly means arranged upon each bar and disposed for movement thereon, and each cable at its said other end connecting to one of said roller assembly.

20. The invention of claim 19 and wherein each roller assembly means provided upon each said bar including a pair of rollers, each roller disposed to either side of the said vertical bar and being fixed into position thereat for shifting vertically upon the said bar.

21. The invention of claim 19 wherein said uprights and parallel vertically aligned bars are telescopically mounted within the said equipment for accommodating a reduction in their size as when not in use.

22. The invention of claim 19 and including frame means supporting the said arranged bars, said frame means being foldable to facilitate equipment storage as when not in use.

23. The invention of claim 22 wherein said frame means being roller mounted.

24. The invention of claim 22 wherein the uprights of each frame means clamps to the trampoline.

25. The invention of claim 19 wherein the locating of said bars is adjustable with respect to each upright to provide for their repositioning to adjust to the varying height of the user.

26. The invention of claim 18 and including a release means interconnecting between a bearing and each cable and when actuated disconnecting each cable from its attachment with the support.

27. The invention of claim 26 wherein said release means includes one of a solenoid and electromagnet.

28. A bearinged support being designed for use by the invalid to facilitate movement and comprising a structural member provided for embracing the invalid, said structural member being resilient in content, and having upper and lower edges, a series of keepers provided spacedly around the proximate upper and lower edges of said structural member, a pair of races, one of each race being held by the keepers associated with the upper and lower member edges, at least a pair of bearings operatively associated with the races of said support, each bearing comprising a pair of rotatable members, each pair of members being rotatable about a common axis and capable of simultaneously turning in opposite directions, a shaft having the members rotatably mounted thereon and providing the common axis about which the said members turn, bearing means arranged intermediate the rotatable members and their shaft to facilitate the turning of said members therearound, said structural member being separable to allow its installation upon the invalid, fastening means operatively associated with said member to secure its separate ends together as during usage, a track suspended above the area of movement, a pair of crossarms, said crossarms being spaced apart a fixed distance a beam securing to said crossarms and provided for spacing of the same apart the said fixed distance, said beam and crossarms being roller mounted upon the track for movement therealong, a series of cables, one end of each cable being operatively associated with the support bearings and extending angularly upwardly therefrom for connection with one of said crossarms and beam, whereby the said support is suspended approximately centrally of the said beam and crossarms combination for providing stability in the support of the retained invalid.

29. The invention of claim 28 and wherein said cables include rigid means within the reach of the invalid to furnish further stability for the user during application of said support.

30. The invention of claim 28 and including means provided for alternatively raising and lowering the support relative to the said track, said means including a moveable member connecting upon the said beam and capable of shifting along its length, said cables being connected with said member, whereby the shifting of said movable member in one direction along said beam provides for a raising of said cables and their associated support, and the shifting of said moveable member in the other direction providing for a lowering of said cables and their held support.

31. The invention of claim 30 and including said moveable member having a threaded connection with the beam, a turning of said beam furnishing the said directional shift for the said moveable member with respect to said beam.

32. The invention of claim 31 and including hand control means connecting to the said crossarms and beam combination and providing for controlling the shift of the moveable member with respect to its threadedly connecting beam.

33. A crossarm for use in conjunction with gymnastic equipment including a bearinged support suspended from a held track, said crossarm being roller mounted for movement along said track, a series of cables, one of each cable operatively associated with the equipment and capable of extension angularly away therefrom for connection with the crossarm, said crossarm extending laterally to either side of the track, said crossarm comprising a tubular member, a sheave rotatably mounted proximate each end of the tubular member, one of each cable extending from the support arranged around a sheave and extending further into and partially through the said tubular member, one of each spring means being disposed within each laterally extending portion of the tubular member of the crossarm, one of each cable extends through the spring means and secures to its inner disposed end, a pair of securing means, one of each securing means connecting at one end to the crossarm in the proximity of the held track, and extending at its other end also through the said spring means for attachment at its outer disposed end, whereby pressure exerted upon the said cables contracts the said spring means for adjustably varying the length of the said cables with respect to the distance between the crossarm and its suspended support.

34. The invention of claim 33 wherein said supported track includes a pair of web connected channels, at least a pair of rollers rotatably mounted to the crossarm, one of each roller being disposed for riding upon one of said track channels.

35. The invention of claim 33 wherein said crossarm is cantilever suspended from a wall, frame means suspending the crossarm from the wall, said frame means capable of folding for disposition of the crossarm proximate the wall as when not in use.

36. The invention of claim 35 wherein said crossarm is pivotally connected to the track.

* * * * *